(12) United States Patent
Moughton et al.

(10) Patent No.: US 12,042,079 B2
(45) Date of Patent: Jul. 23, 2024

(54) THERMALLY SENSITIVE CONTROLS

(71) Applicant: Strix Limited, Isle of Man (GB)

(72) Inventors: Colin Peter Moughton, Port St. Mary (GB); Richard Brandon Fumagalli, Chester (GB); Alan Campbell Owen, Ronaldsway (GB)

(73) Assignee: STRIX LIMITED, Ronaldsway (IM)

( * ) Notice: Subject to any disclaimer, the term of this patent is extended or adjusted under 35 U.S.C. 154(b) by 975 days.

(21) Appl. No.: 16/971,605

(22) PCT Filed: Feb. 22, 2019

(86) PCT No.: PCT/GB2019/050496
§ 371 (c)(1),
(2) Date: Aug. 20, 2020

(87) PCT Pub. No.: WO2019/162689
PCT Pub. Date: Aug. 29, 2019

(65) Prior Publication Data
US 2021/0093118 A1 Apr. 1, 2021

(30) Foreign Application Priority Data

Feb. 23, 2018 (GB) .................................... 1802977
Nov. 23, 2018 (GB) .................................... 1819121

(51) Int. Cl.
*A47J 27/21* (2006.01)
*H05B 1/02* (2006.01)

(52) U.S. Cl.
CPC ..... *A47J 27/2105* (2013.01); *A47J 27/21058* (2013.01); *A47J 27/21108* (2013.01);
(Continued)

(58) Field of Classification Search
None
See application file for complete search history.

(56) References Cited

U.S. PATENT DOCUMENTS

| 5,971,810 A | 10/1999 | Taylor |
| 6,080,968 A | 6/2000 | Taylor |
| 2014/0263270 A1 | 9/2014 | Garvey |

FOREIGN PATENT DOCUMENTS

| CN | 2031239 U | 1/1989 |
| CN | 101181132 A | 5/2008 |

(Continued)

OTHER PUBLICATIONS

EP Office Action for EP 22166180.4 dated Jul. 6, 2023.
Chinese Office Action for CN201980004777.6 dated Jun. 3, 2021.

*Primary Examiner* — Joseph M. Pelham
(74) *Attorney, Agent, or Firm* — Getz Balich LLC

(57) ABSTRACT

A thermally sensitive control for controlling a power supply circuit to a heater in a liquid heating appliance is provided. The control includes a cordless connector part arranged to mate with a base connector part, first and second moveable electrical contacts mounted on first and second moveable members, and first and second thermally sensitive actuators. The control further includes a latch arm extending across the control between the moveable members, the latch arm including a first latch for the first moveable member and a second latch for the second moveable member, and a release member including a release part and a plunger, wherein the release member is resiliently biased to bring the release part into contact with the latch arm but the resilient bias is overcome when the plunger bears against a surface of the base connector part.

21 Claims, 25 Drawing Sheets

(52) U.S. Cl.
CPC .... *A47J 27/21125* (2013.01); *A47J 27/21041* (2013.01); *A47J 27/21066* (2013.01); *H05B 1/0269* (2013.01)

(56) References Cited

FOREIGN PATENT DOCUMENTS

| | | | | | |
|---|---|---|---|---|---|
| CN | 202533825 U | 11/2012 | | | |
| CN | 202792565 U | 3/2013 | | | |
| CN | 103889283 A | * | 6/2014 | .......... | A47J 27/2105 |
| CN | 103300727 B | 5/2016 | | | |
| CN | 205481823 U | 8/2016 | | | |
| CN | 104299847 B | 9/2016 | | | |
| CN | 210276871 U | 4/2020 | | | |
| CN | 210296231 U | 4/2020 | | | |
| DE | 198 60 931 A1 | 7/2000 | | | |
| DE | 10123528 A1 | 11/2002 | | | |
| EP | 1563773 A1 | 8/2005 | | | |
| EP | 1610354 B1 | 11/2009 | | | |
| EP | 1767128 B1 | 3/2012 | | | |
| GB | 2093275 B | 5/1985 | | | |
| GB | 2 331 141 A | 5/1999 | | | |
| GB | 2397438 A | * | 7/2004 | .......... | A47J 27/2105 |
| GB | 2410615 A | * | 8/2005 | ........ | A47J 27/21125 |
| GB | 2438244 A | * | 11/2007 | .......... | A47J 27/2105 |
| GB | 2509697 A | 1/2013 | | | |
| IN | 202564727 U | 11/2012 | | | |
| JP | H09446 | 1/1997 | | | |
| WO | 9830066 W | 7/1998 | | | |
| WO | 0128294 W | 4/2001 | | | |
| WO | 0156437 W | 8/2001 | | | |
| WO | 2004062445 A2 | 7/2004 | | | |
| WO | 01/01830 A1 | 1/2011 | | | |
| WO | 2012164319 A2 | 12/2012 | | | |
| WO | 2013093526 A1 | 6/2013 | | | |
| WO | 2014001755 A1 | 1/2014 | | | |

* cited by examiner

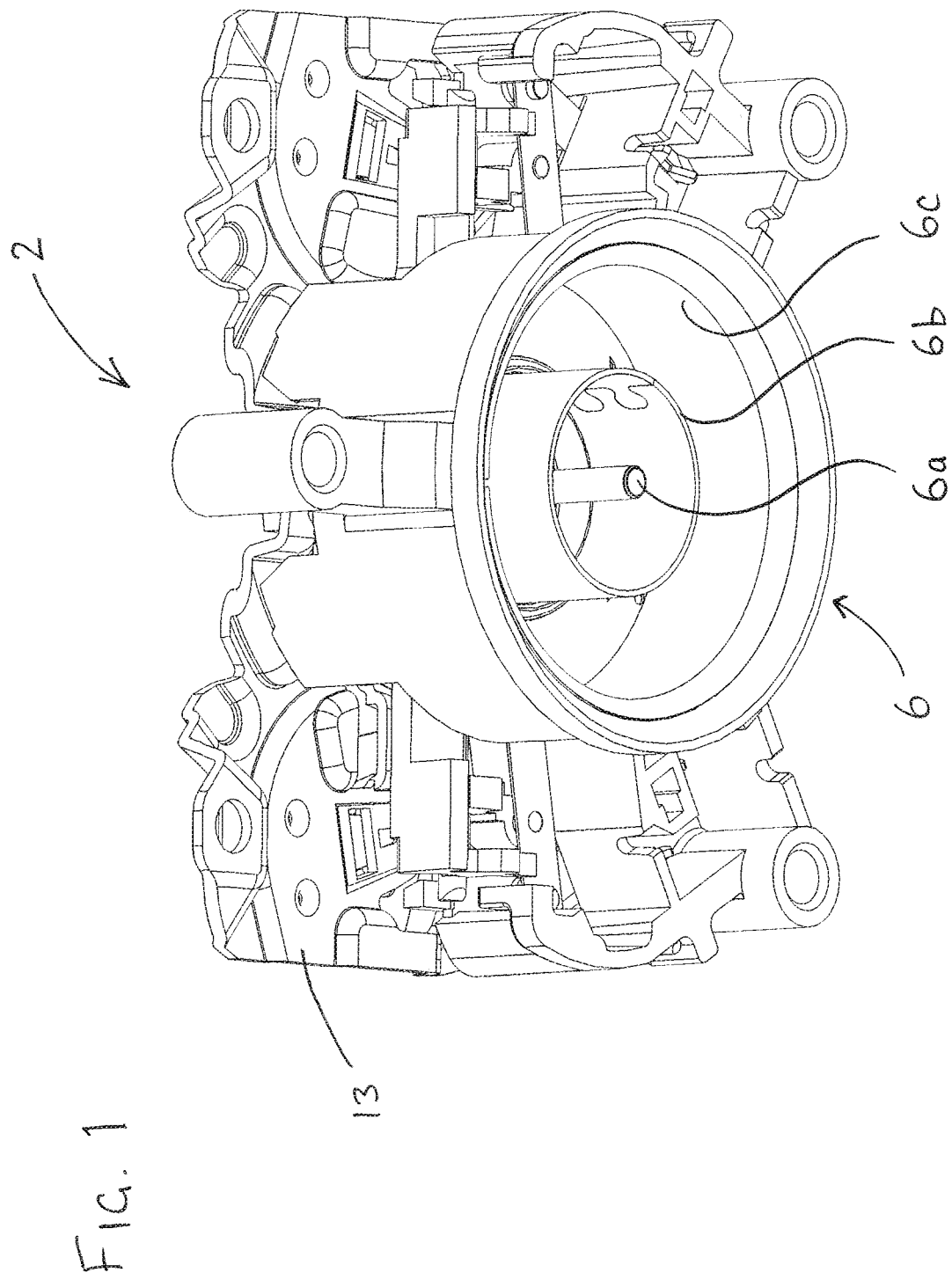

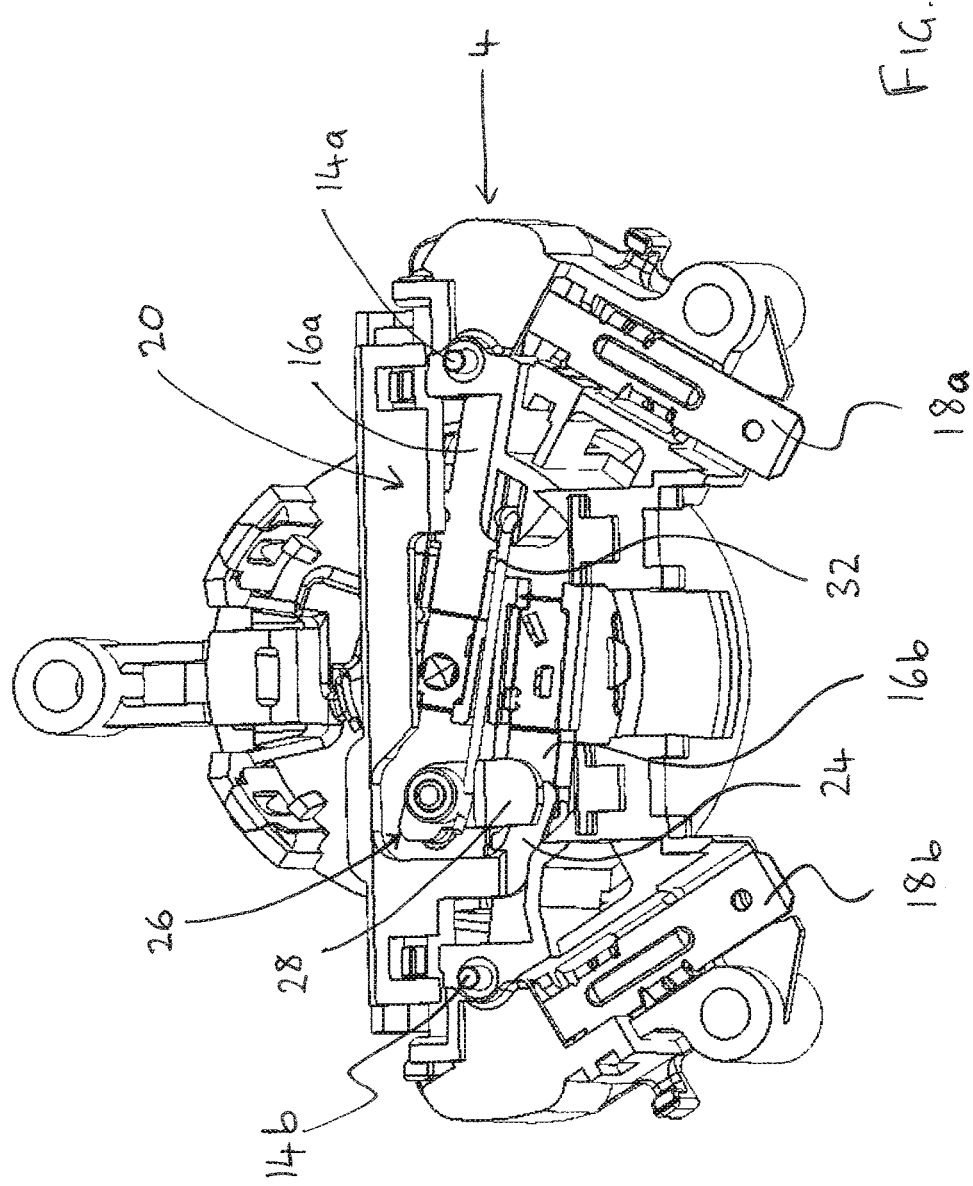

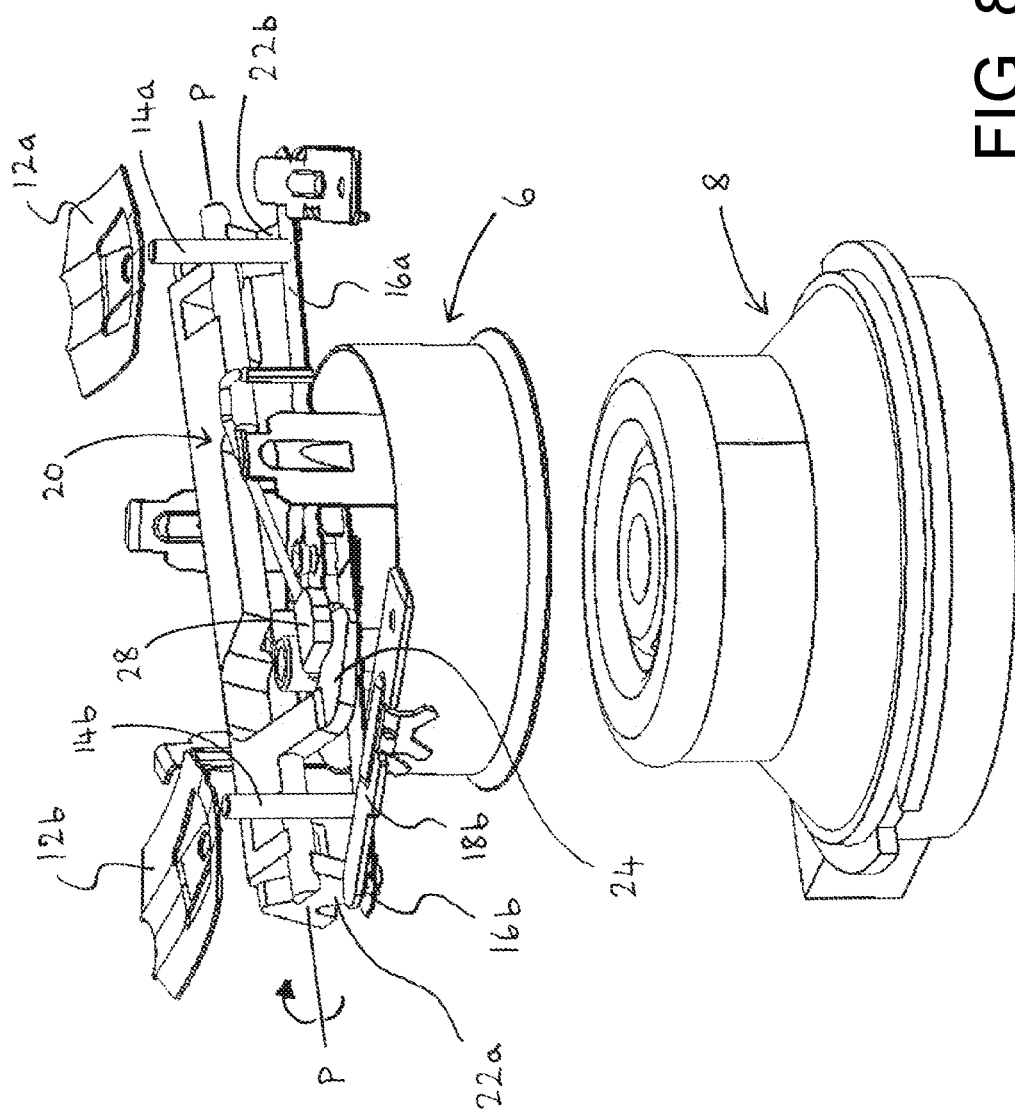

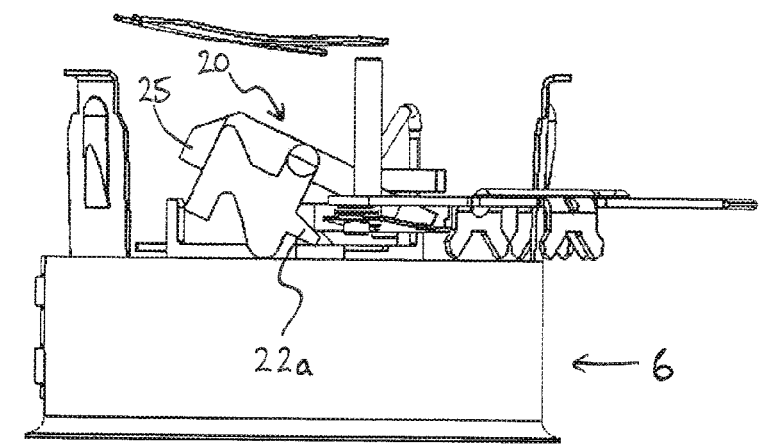
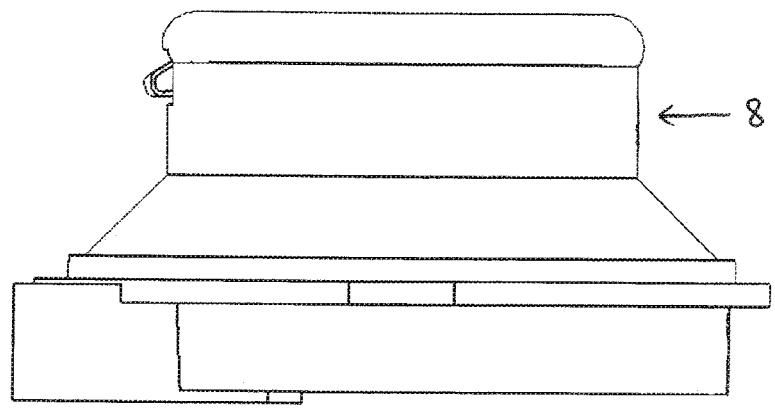
FIG. 8B

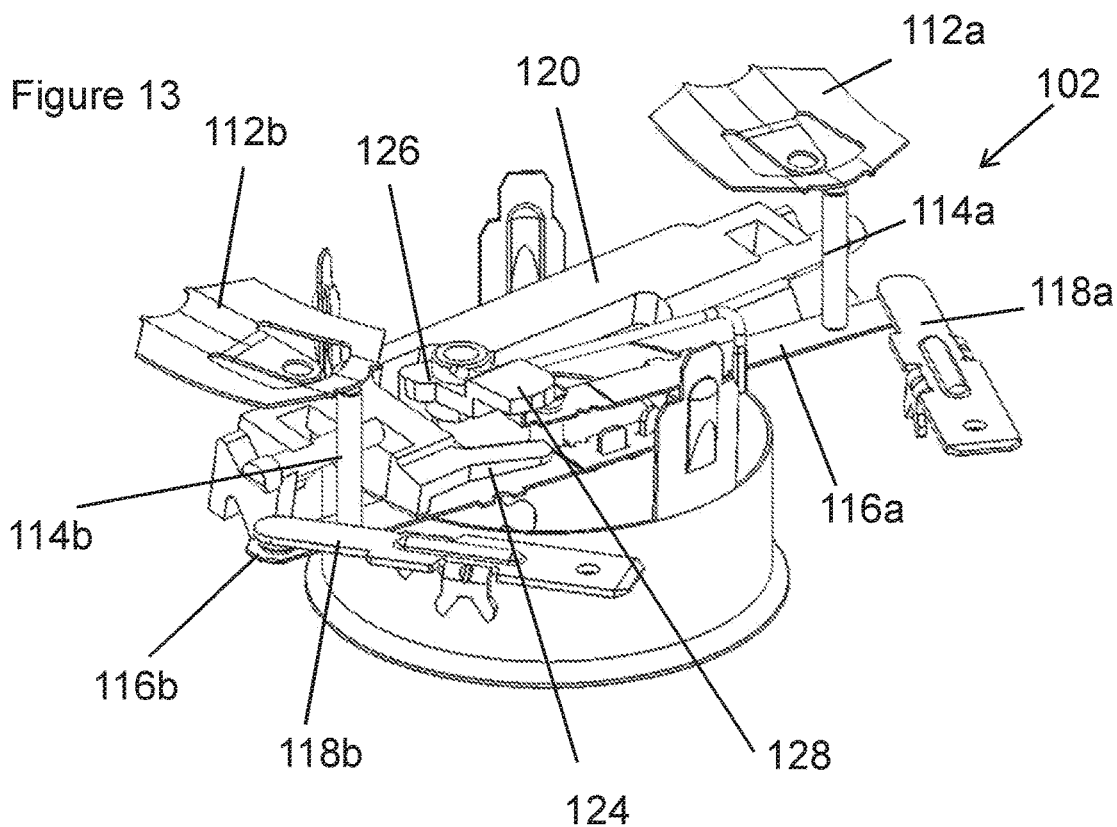
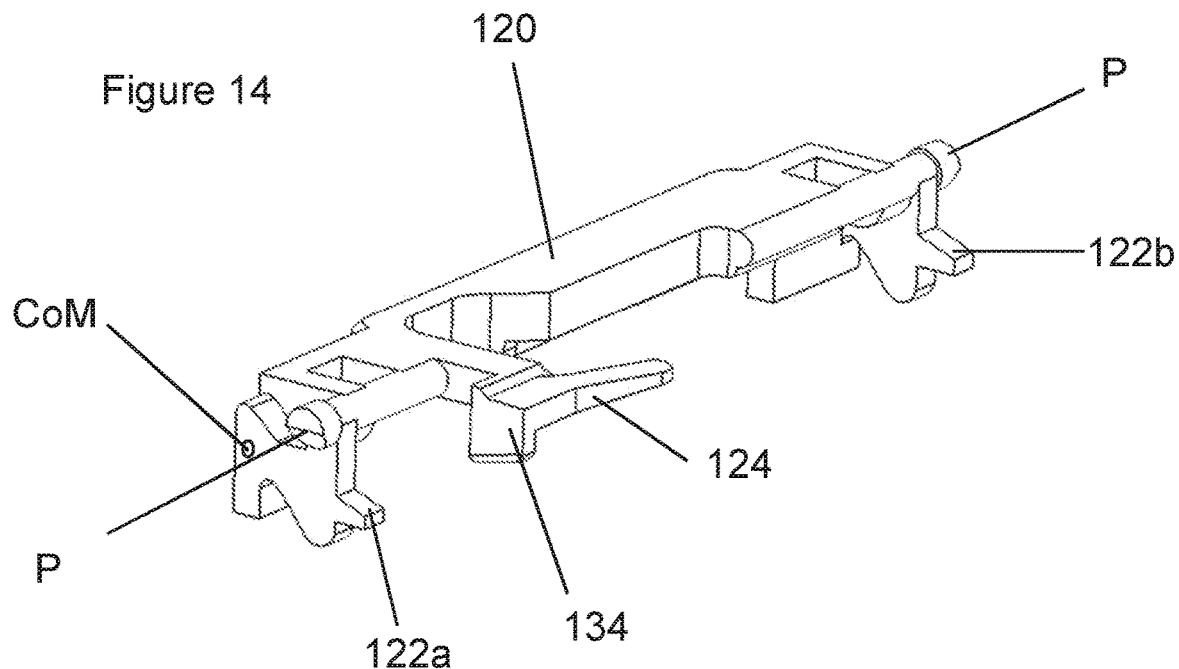

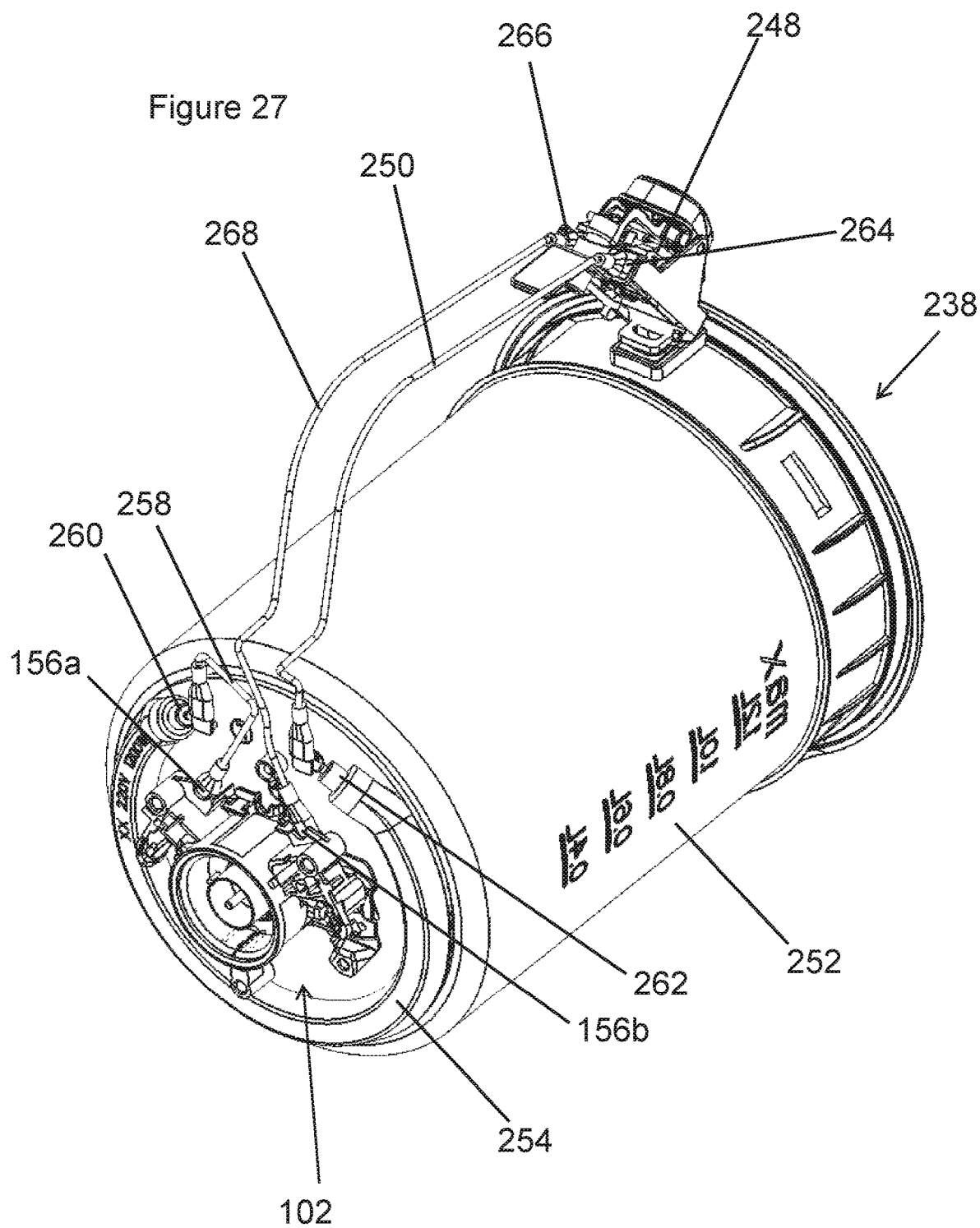

THERMALLY SENSITIVE CONTROLS

This application is entitled to the benefit of, and incorporates by reference essential subject matter disclosed in PCT Application No. PCT/GB2019/050496 filed on Feb. 22, 2019, which claims priority to GB Patent Appln. No. 1802977.7 filed Feb. 23, 2018 and GB Patent Appln. No. 1819121.3 filed Nov. 23, 2018, which are hereby incorporated by reference in their entireties.

BACKGROUND OF THE INVENTION

It is known to provide a liquid heating appliance, such as a kettle, with dry boil protection using a thermally sensitive control comprising one or more thermally sensitive actuators that are mounted in good thermal contact with its heated base. The actuator(s) operate to automatically interrupt the power supply upon detecting an overheat condition e.g. because the kettle has boiled dry or been turned on without any water inside. WO 95/34187 discloses a control comprising a pair of overheat bimetallic actuators, e.g. as seen in the Applicant's U10 and U1830 series of controls.

Furthermore, many kettle controls are provided with a "Lift-Off-Reset" function, whereby a pair of contacts in the power supply circuit is latched open until the kettle is lifted from a supporting surface, typically the power base for a cordless kettle. This ensures that the power supply circuit is not reconnected until the kettle has been lifted to be refilled, thereby avoiding a cycling effect when an actuator cools below its reset temperature. WO 98/30066 provides an example of a liquid heating appliance comprising a control in which the contacts for the live pole are latched open and prevented from re-closing until the vessel is lifted up from a support surface. WO 2004/062445 provides another example of a dry boil control for a cordless water heating appliance. This control comprises a pair of bimetallic actuators, each associated with a pivotally-mounted trip lever, and a pair of wire springs arranged to provide a latching function for each trip lever. In the event that one or other or both of the actuators responds to an overheat condition, causing the associated trip lever to pivot and open a corresponding pair of contacts, the associated wire spring latches the trip lever in position and prevents its return until the cordless appliance is lifted off its power base.

A benefit of latching open the contacts associated with each bimetallic actuator in a control is that automatic reset may be completely avoided and this may remove the need for an additional thermal fuse for compliance with official standards.

There remains a need for an improved control that can efficiently and reliably latch open more than one pair of contacts after operation of at least one of the overheat protection actuators.

SUMMARY OF THE INVENTION

According to a first aspect of the present invention there is provided a thermally sensitive control for controlling an electrical power supply circuit to a heater in a liquid heating appliance, the control comprising: a cordless electrical connector part arranged to mate with a corresponding base electrical connector part; first and second moveable electrical contacts mounted on first and second moveable members, each mating with a corresponding fixed electrical contact in the electrical power supply circuit when the first and second moveable members are respectively in a closed position; first and second thermally sensitive actuators, each independently operable at an overheat temperature to move a respective one of the first and second moveable members from the closed position to an open position wherein the first and second moveable electrical contacts are separated from the fixed electrical contacts to interrupt the electrical power supply circuit; a pivotally mounted latch arm extending laterally across the control between the first and second moveable members, the latch arm comprising a first latch for the first moveable member and a second latch for the second moveable member; and a release member comprising a release part and a plunger projecting from the cordless electrical connector part, wherein the release member is resiliently biased to bring the release part into contact with the latch arm but the resilient bias is overcome when the plunger bears against a surface of the corresponding base connector part; wherein, when the cordless electrical connector part is mated with the corresponding base electrical connector part, and when at least one of the first and second moveable members is moved towards the open position, such movement causes the latch arm to pivot so that the respective first or second moveable member moves past the respective first or second latch before the latch arm pivots back to adopt a latching position, in which the first or second latch can prevent the respective first and second moveable member from subsequently moving from the open position back to the closed position; and wherein, when the cordless electrical connector part is separated from the corresponding base electrical connector part, the release part is resiliently biased into contact with the latch arm, thereby causing the latch arm to pivot out of the latching position such that the first and/or second moveable member is no longer prevented from moving from the open position back to the closed position.

It will be appreciated that such a thermally sensitive control provides a dual pole Lift-Off-Reset (LOR) function, as the latch arm extends laterally across the control between the first and second moveable members that are operated by the first and second thermally sensitive actuators. For example, the first and second moveable members may carry the electrical contacts for the live and neutral poles, respectively, of the electrical power supply circuit (or vice versa). As the latch arm comprises both first and second latches, either or both of the first and second moveable members is prevented from subsequently moving from the open position back to the closed position, regardless of which of the first and/or second thermally sensitive actuators has operated. Often the control will be connected to an electrical power supply circuit such that the moveable member carrying the electrical contact in the neutral pole is moved to the open position before the moveable member carrying the electrical contact in the live pole, e.g. by arranging the associated thermal sensitive actuator to operate at a lower temperature. However the control manufacturer is not typically responsible for how the control is connected to the electrical power supply circuit in a liquid heating appliance and it is advantageous that the control provides the same LOR function irrespective of which moveable member is moved to the open position first. This ensures compatibility with any dual pole mains electrical power supply circuit.

A benefit of a single latch arm being shared by the first and second moveable members is that the part count can be reduced as compared to prior art trip lever arrangements. In fact the latch arm and release member may comprise the same number of additional LOR components as a single pole latching arrangement in the prior art.

In one or more embodiments, the control comprises a control body and the cordless electrical connector part is formed in the control body. The control body may be a monolithic (e.g. molded) plastics material body. Preferably the latch arm and release member are mounted to the control body. The control body could, for example, include appropriate mounting features for the latch arm and release member. If there is no demand for a LOR function in a particular liquid heating appliance then the latch arm and release member could be omitted during assembly of the control. The same control body may therefore be configurable to provide both LOR and non-LOR versions of a thermally sensitive control. Of course this is a benefit in terms of tooling costs and manufacturing flexibility. The mounting features for the latch arm and release member may be simple additions to the basic control body design that can be accommodated without requiring a re-design of the control architecture, unlike the conventional approach of manufacturing separate LOR and non-LOR controls. A further advantage is that the control body can have the same overall footprint and hence appliance manufacturers can have a single design for both LOR and non-LOR versions of the control.

The structure and operation of the LOR components mounted in the control will now be described in more detail.

In the latching position of the latch arm, the first and second latches are in a position to prevent the respective first and second moveable members from subsequently moving from the open position back to the closed position. The first/second latches may or may not be physically engaged with the first/second moveable members in this position.

In one or more embodiments, the latch arm adopts a latching position in which the first/second latch engages with the first/second moveable member so as to prevent the first/second moveable member from subsequently moving from the open position back to the closed position. In such embodiments, the first moveable member that is in the open position engages with the first latch so as to be held in the open position by the latch arm and/or the second moveable member that is in the open position engages with the second latch so as to be held in the open position by the latch arm. The first/second moveable member may be held or gripped by the latch arm in its latching position.

When the latch arm is caused to pivot out of the latching position, the pivoting of the latch arm may move the first/second latch out of engagement with the first/second moveable member and thereby allow the first/second moveable member to move from the open position back to the closed position. As is described further below, the first and second moveable members may be resiliently biased to move back to the closed position (i.e. tending to close the contact pairs when the control is not active).

In one or more embodiments, the latch arm adopts a single latching position and the open position of the first/second moveable member may comprise multiple (e.g. two) stages but at each stage the first/second moveable member is prevented from moving back to the closed position. For example, the open position may comprise a first stage in which the first/second moveable member is spaced away from the respective first/second latch, e.g. the first/second moveable member may be positioned below the first/second latch due to the movement caused by operation of the first/second thermally sensitive actuator. For example, the open position may comprise a second stage in which the first/second moveable member is in contact with the respective first/second latch, e.g. the first/second moveable member may be positioned in engagement with the first/second latch. Such a second stage may occur if the first/second moveable member is released due to reset of the associated first/second thermally sensitive actuator, the first/second moveable member then tending to return to its closed position but prevented from doing so by coming into contact with the respective first/second latch. In any of these examples, the open position may comprise a first stage in which the first/second moveable member has been moved in one direction by operation of the first/second thermally sensitive actuator, and a second stage in which the first/second moveable member tends to move in another direction e.g. following reset of the first/second thermally sensitive actuator.

It is the pivotal mounting of the latch arm that allows the first/second moveable member to move past the respective first/second latch when moving towards the open position, e.g. the latch arm pivoting the first and second latches out of the way. The pivoting of the latch arm may be an indirect consequence of the first/second moveable member moving towards the open position, for example the control may comprise a mechanism to convert movement of the first/second moveable member into pivotal movement of the latch arm. However, in order to keep the number of LOR components to a minimum, it is preferable that the movement of the first and/or second moveable members towards the open position causes the latch arm to pivot by at least one of the moveable members pushing against the latch arm. Thus, when at least one of the first and second moveable members is moved to the open position, the latch arm is directly caused to pivot to accommodate the moveable members moving past the latches.

The pivotal mounting of the latch arm enables the latch arm to pivot when the first/second moveable member is moved towards the open position so that the first/second moveable member moves past the respective first/second latch before the latch arm pivots back to adopt its latching position. The first and second latches may have any suitable form that facilitates this movement of the first and second moveable members. However, since the first and second latches must also be able to prevent the respective first and second moveable members from subsequently moving from the open position back to the closed position, a multi-edged profile has been found to work well. In one or more embodiments, the first and second latches each comprise a first edge at an angle to a second edge that is contiguous with the first edge. The angle between the first and second edges may be up to 135° and preferably up to 90°, for example in the range of 45° to 90°. The first and second edges may define a beak-like profile for the first and second latches. When the latch arm pivots back to its latching position, such a beak-like profile (e.g. with an angular range of 45° to 90° between the first and second edges) may be positioned to catch the first or second moveable member as it tends to move back to the closed position. In a set of embodiments, the first and second latches each comprise a first surface at an acute angle to a second surface to form a wedge shape.

Preferably the latch arm is arranged to automatically pivot back to adopt its latching position after the first/second moveable member moves past the respective first/second latch. In some embodiments the control may comprise a return mechanism for the latch arm. For example, the latch arm could be resiliently biased (e.g. by a spring member) to pivot back to its latching position. However, in order to keep the number of LOR components to a minimum, it is preferable that the latch arm is arranged to automatically pivot back to its latching position under the action of gravity. This may be achieved by appropriate positioning of the latch arm's center of mass. For example, the center of mass of the latch arm may be laterally offset from a pivot axis passing through the latch arm. The material thickness and/or shape of the latch arm can be adjusted to affect the position of its center of mass. Alternatively, or in addition, the pivotal mounting points of the latch arm in the control can be adjusted to affect the position of its center of mass. It is an advantage that the latch arm is not resiliently biased, unlike prior art trip lever arrangements, as it means that no spring member is required.

In embodiments wherein the control comprises a control body, preferably the latch arm is pivotally mounted to the control body. When the cordless electrical connector part is mated with a corresponding base electrical connector part, the control body is stationary but the latch arm may be free to pivot, or at least partially free to pivot. The control body may comprise one or more stop features arranged to limit pivotal movement of the latch arm. The latch arm may be in contact with a stop feature on the control body in its latching position. The stop feature therefore helps to define the latching position. In embodiments wherein the latch arm is arranged to automatically pivot back to its latching position, such a stop feature prevents the latch arm from pivoting back too far. This is particularly helpful when the latch arm is pivoting under gravity and may tend to over-swing. The latch arm is therefore brought quickly to a stop rather than oscillating about its latching position.

As discussed above, the latch arm may be arranged to pivot automatically into the latching position as long as the release part is not in contact with the latch arm. When the cordless electrical connector part is separated from the corresponding base electrical connector part, i.e. "lift-off", it is the release part being resiliently biased into contact with the latch arm that causes the latch arm to pivot out of the latching position. The resiliently biased movement of the release member is counteracted by the plunger bearing against a surface of the corresponding base connector part when the cordless electrical connector part is mated with the corresponding base electrical connector part. In one or more embodiments, the plunger projects downwardly from the cordless electrical connector part and the release member is resiliently biased downwardly to bring the release part into contact with the latch arm. When the plunger bears against a surface of the corresponding base connector part, the release member is pushed upwardly to raise the release part out of contact with the latch arm. The release member is preferably arranged in the control such that the release part is above the latch arm. The release part may project laterally from the release member towards the latch arm. The latch arm may comprise a paddle projecting laterally towards the release member to make contact with the release part. It is an advantage that a single latch arm extends laterally across the control between the first and second moveable members, meaning that a single release member can provide a LOR function regardless of which of the first and/or second thermally sensitive actuators has operated.

In embodiments wherein the control comprises a control body, preferably the release member is mounted to the control body for resiliently biased movement (e.g. up/down movement) relative to the control body. The control body may include an aperture in the cordless electrical connector part through which the plunger projects. The release member may be resiliently biased as a result of its own material resilience. The release member may, for example, comprise a leaf spring carrying the release part and the plunger. However in preferred embodiments the release member is resiliently biased by a spring member mounted between the release member and the control body. The spring member may be a wire spring, e.g. a metal spring wire or blade. The release member may comprise a plastics material body. To reduce the part count for the LOR components, preferably the release member is a monolithic part (e.g. a single plastics molding) in which the release part and plunger are integrated. As is mentioned above, the release member and its associated spring member may simply be omitted to make a non-LOR version of the control.

The first and second thermally sensitive actuators may be arranged in any suitable position in the control in order to detect an overheat temperature. Typically the first and second thermally sensitive actuators are arranged on an upper surface of the control, for example mounted on a metal plate above the control body, so that they can easily be brought into thermal contact with a heater in a liquid heating appliance. As is known in the art, the first and second thermally sensitive actuators may comprise bimetallic actuators, preferably snap-action bimetallic actuators. Since the first and second thermally sensitive actuators each operate to move a respective one of the first and second moveable members, it is preferable for the first and second thermally sensitive actuators to be positioned in alignment with (e.g. above) the respective first and second moveable members. In one or more embodiments, each of the first and second thermally sensitive actuators may be associated with a push rod that is operated on by the actuator to move a respective one of the first and second moveable members. The push rods may extend downwardly from the first/second thermally sensitive actuators towards the first/second moveable member. In such embodiments the latch arm may extend laterally across the control between the first and second thermally sensitive actuators.

When the cordless electrical connector part is separated from the corresponding base electrical connector part, i.e. "lift off", the release part causes the latch arm to pivot out its latching position. This means that mating of the first/second moveable electrical contact with its respective fixed electrical contact in the electrical power supply circuit is now possible, but subject to the first/second thermally sensitive actuator undergoing reset to allow the first/second moveable member to move back to the closed position. Even if the first/second thermally sensitive actuator undergoes thermal reset, e.g. so that the associated push rod is no longer bearing down on the first/second moveable member, to remake the contacts the control must provide for the first/second moveable member to move back to the closed position. Preferably the control comprises means to automatically move the first/second moveable member from the open position back to the closed position after reset of the first/second thermally sensitive actuator. The first and second moveable members may be resiliently biased to return to the closed position. In many embodiments the first and second moveable members each comprise a leaf spring carrying the moveable electrical contact. In some other embodiments the first and second moveable members are resiliently biased by a separate spring member, for example as seen in the Strix KeAi series of controls described in WO2012/164318.

As is well known in the art, the first and second thermally sensitive actuators may automatically reset upon cooling below the overheat temperature to a set remake temperature. The first and second thermally sensitive actuators may each operate at the same or different overheat temperatures. Reference is made to the Strix U10 and U18 series of controls described in WO95/34187, the content of which publication is hereby incorporated in its entirety.

The Applicant has recognized that the resiliently biased release member can perform further functions in addition to moving the latch arm to move the first and second latches out of the latched position. In another set of embodiments, the release member is resiliently biased such that the release part also causes movement of the first moveable member into the open position and the release member is arranged such that as the cordless electrical connector part is being separated from the corresponding base electrical connector part, the release part drives the first moveable member into the open position thereby interrupting the electrical power supply circuit. As will be appreciated, in such a set of embodiments, as the cordless electrical connector part is being separated from the corresponding base connector part, the resiliently biased release member will cause movement of the first moveable member into the open position and thereby break the electrical power supply circuit to the heater. Therefore, as an appliance, e.g. a kettle, comprising the control is lifted, the electrical power supply circuit will be broken by moving the first moveable member to separate the first moveable electrical contact and corresponding fixed electrical contact. The Applicant has recognized that such an arrangement is advantageous as switching on the aforementioned contacts prevents electrical switching occurring between the connector parts. This means that the electrical conductors on the connector parts do not require silver coating and thus achieves a cost saving.

As will be appreciated by those skilled in the art, in a situation wherein the first thermally sensitive actuator has operated to move the first moveable member into the open position whilst the cordless electrical connector part and corresponding base connector part are fully mated, when the cordless electrical connector part is being separated from the corresponding base connector part the first moveable member may not, depending on the specific arrangement of the various components, be able to move back to its closed position. The reason for this is that the release member may move into a position which corresponds to the first moveable member being in the open position. In other words, in certain situations wherein the first moveable member is already in the open position, the resiliently biased release member may simply move to hold it in this position. This ensures that the power supply circuit remains broken as the cordless electrical connector part and corresponding base connector part are being separated and thus prevents switching occurring between the connector parts.

Reference to the cordless electrical connector part being separated from the corresponding base connector part, should be understood as referring to the beginning of a movement leading to separation but before the electrical connection between the cordless electrical connector part and the corresponding base connector part is broken. In a set of embodiments the cordless electrical connector part comprises at least two mating conductors arranged to come into contact with at least two corresponding electrical terminations in the corresponding base electrical connector part when the cordless electrical connector part and corresponding base connector part are fully mated together, and wherein the release member is arranged such that as the cordless electrical connector part is being separated from the corresponding base electrical connector part, the release part drives the first moveable member into the open position, thereby interrupting the electrical power supply circuit whilst the at least two mating conductors in the cordless electrical connector part are still in contact with the corresponding at least two electrical terminations in the base electrical connector part.

In addition to acting on the latch arm, the release member may be arranged also to act directly on the first moveable member to move it into the open position. However, in a preferred set of embodiments the resiliently biased release part drives a switching member into contact with the first moveable member to move the first moveable member into the open position. Such a switching member may comprise a separate, dedicated, component for acting on the first moveable member to move it into the open position, i.e. it may comprise a separate part to the latch arm. However, in a preferred set of embodiments the switching member is integrally provided with the latch arm, and extends therefrom. Such a set of embodiments is advantageous as the latch arm can provide a dual function of both latching the first and second moveable members in the open position in the case of an overheat situation, and also moving the first moveable member into the open position when the cordless electrical connector part is being separated from the corresponding base connector part. This may reduce the number of components required for the control and simplify its construction.

The switching member may be integrally provided with the latch arm in any suitable manner and the specific arrangement of the switching member relative to the first latch and second latch on the latch arm may depend on the arrangement of the rest of the components of the control. Nonetheless, in a set of embodiments, the latch arm comprises a pivot axis about which the latch arm is pivotally mounted, and wherein the first latch and second latch and the switching member are arranged such that, when the latch arm is driven by the release member, as at least one of the first latch and second latch is moved out of the latching position, the switching member is moved into contact with the first moveable member. Accordingly, as will be appreciated, as the latch arm is driven to move the first latch and second latch out of the latching position, the switching member is driven to move, or to hold, the first moveable member in the open position, thereby ensuring that the power supply circuit remains broken as the cordless electrical connector is being separated from the corresponding base connector part.

In order to ensure that the first moveable member is moved into the open position prior to the electrical disconnection of any conductors in the cordless base connector and corresponding base connector part, the Applicant has recognized that it may be advantageous to amplify the effect the separation of the cordless electrical connector part and the corresponding base connector part has on the movement of the first moveable member. Accordingly, in a set of embodiments, the release part of the release member comprises an angled surface arranged to act on the latch arm. The Applicant has recognized that as the latch arm is pivotally mounted, as the release part acts on the latch arm, the latch arm will pivot and also move partially along the release part. Providing the release part with an angled surface will mean that as the latch arm, e.g. the paddle thereof, moves along the release part, as the release part moves downwards and drives the movement of the latch arm, the latch arm will move down the angled surface of the release part which will increase the downwards component of the movement on the latch arm thus increasing its pivotal movement. In addition, or alternatively, the latch arm, e.g. the paddle thereof, may be provided with an angled surface which the release part contacts. This may achieve the same effect as that described above.

The resiliently biased release member may also act in an identical manner to that described above on the second moveable member to provide a further switching function on the second moveable electrical contact and corresponding electrical contact. The control may comprise a second switching member, which may also be independent of, or integrated with, the latch arm. However, the Applicant has recognized that it may be advantageous for the release member only to move the first moveable member. Accordingly, in a set of embodiments, the second moveable member is only capable of being moved by the second thermally sensitive actuator. As will be appreciated, in such a set of embodiments, the switching function achieved by the release member moving the first moveable member, and not the second moveable member, results in switching due to separation of the cordless electrical connector part and corresponding base electrical connector part only occurring on one contact pair, i.e. the first moveable electrical contact and corresponding fixed contact. The Applicant has recognized that restricting this switching to one contact pair may reduce the amount of silver required to be used on the electrical contacts and thus reduce the cost of the control.

In a set of embodiments, the first moveable electrical contact provided on the first moveable member is the neutral electrical contact. As the neutral electrical contact is effectively downstream of the load, whilst the current passing through the neutral electrical contact is the same, the voltage is lower and thus the chance of arcing as the neutral electrical contact is separated is reduced.

In a set of embodiments there is provided a control assembly comprising a control as described above and a base electrical connector part mated with the cordless electrical connector part. In use, the mating between the connector parts allows the control to be connected to an electrical power supply circuit. The base electrical connector part may include tabs for electrical connection to a mains power supply cable, or the mains power supply cable may be integrated with the connector part. Typically, the base electrical connector part is mounted in a power base stand for the liquid heating appliance housing the control.

The cordless electrical connector part and corresponding base electrical connector part may be of the type that can be mated regardless of their relative angular orientation, or at least through a wide angular range e.g. at least 340° and preferably up to 360°. Suitable cordless connectors of this "360° type" are described in WO95/08204 and WO01/28294, and available as the Strix P72 or P76 connector parts.

The cordless electrical connector part may comprise at least two mating conductors, for connecting to the live and neutral poles of the power supply circuit. An additional earth connection may be present. In some embodiments, the cordless electrical connector part is a 3-pole connector part (e.g. for mating with a Strix P72). In other embodiments, the cordless electrical connector part is a 5-pole connector part (e.g. for mating with a Strix P76). Such 5-pole connector parts provide for electronic signal connection as well as electrical power connection.

In many embodiments the fixed electrical contacts in the electrical power supply circuit are provided within the control. For example, the fixed electrical contacts may be mounted to the control body. However, in some embodiments the fixed electrical contacts may be provided within the base electrical connector part. Such an arrangement is seen in the Strix KeAi series of controls and described in WO2012/164318.

The Applicant has recognized that electrically switching on the first moveable electrical contact and corresponding fixed electrical contact when the cordless electrical connector part is being separated from the corresponding base electrical connector part is novel in its own right and thus when viewed from a further aspect there is provided a liquid heater apparatus comprising: a control unit comprising: a cordless electrical connector part arranged to mate with a corresponding base electrical connector part provided in a cordless base; a first moveable electrical contact mounted on a first moveable member mating with a corresponding fixed electrical contact in the electrical power supply circuit when the first moveable member is in a closed position; a release member comprising a release part and a plunger projecting from the cordless electrical connector part, wherein the release member is resiliently biased such that, when the cordless electrical connector part is being separated from the corresponding base electrical connector part in use, the resiliently biased release part drives movement of the first moveable member from the closed position to an open position wherein the first moveable electrical contact is separated from the fixed electrical contact to interrupt the electrical power supply, but the resilient bias is overcome when the plunger bears against a surface of the cordless base when mated; a first electrical terminal electrically connected to the first moveable electrical contact and a second electrical terminal electrically connected to the fixed electrical contact; an electrical heater, and an electrical switching arrangement physically separate from but electrically connected to the control unit between the first electrical terminal and the second electrical terminal of the control unit.

The electrical switching arrangement may, for example, comprise any suitable arrangement for cutting the electrical power supply to the electrical heater once a specific condition has been met. In a set of embodiments, the electrical switching arrangement comprises a thermomechanical, e.g. a bimetallic, switch. Such a switch may, for example, be sensitive to the temperature of the liquid being heated by the liquid heater system. In an additional or alternative set of embodiments, the electrical switching arrangement comprises an electronic switching arrangement, for example comprising a controller connected to a thermistor.

The specific condition at which the electrical switching arrangement cuts electrical power supply to the electrical heater may be any one of a number of different conditions, for example a set temperature, a set temperature change, a rate of temperature change, a time period etc. As will be appreciated by those skilled in the art, the appliance in accordance with this aspect of the invention comprises an electrical switching arrangement which is separate from the control unit comprising the cordless electrical connector part. It may, for example, be arranged in a different part of the appliance to the control. Taking a kettle, as an example, the control may be arranged in the base of the kettle and the switching arrangement may be arranged in an upper portion of the kettle. Therefore, in accordance with this aspect of the invention, the electrical power supply to the heater may be cut through operation of the switching arrangement or separation of the cordless electrical connector part from the corresponding base connector part.

Similarly to the embodiments described above, as the cordless electrical connector part is being separated from the corresponding base connector part, the resiliently biased release member will no longer be overcome entirely by the corresponding base connector part and the release member will therefore cause movement of the first moveable member into the open position and thereby break the electrical power supply circuit to the heater. Therefore, as the appliance, e.g. a kettle, is lifted, the electrical power supply circuit will be broken by moving the first moveable member to separate the first moveable electrical contact and corresponding fixed electrical contact. As discussed above with respect to earlier embodiments, the Applicant has recognized that such an arrangement is advantageous as it prevents electrical switching during lift-off of the appliance occurring between the cordless electrical connector part and corresponding base connector parts. This, advantageously means that the contacts in the connector parts do not require silver coating and thus achieves a cost saving.

Similarly to earlier embodiments, reference to the cordless electrical connector part being separated from the corresponding base connector part, should be understood as referring to the beginning of a movement leading to separation but before the electrical connection between the cordless electrical connector part and the corresponding base connector part is broken. In a set of embodiments the cordless electrical connector part comprises at least two mating conductors arranged to come into contact with at least two corresponding electrical terminations in the corresponding base electrical connector part when the cordless electrical connector part and corresponding base connector part are fully mated together, and wherein the release member is arranged such that as the cordless electrical connector part is being separated from the corresponding base electrical connector part, the release part drives the first moveable member into the open position, thereby interrupting the electrical power supply circuit whilst the at least two mating conductors in the cordless electrical connector part are still in contact with the corresponding at least two electrical terminations in the base electrical connector part.

The release member may be arranged to act directly on the first moveable member to move it into the open position. However, in a preferred set of embodiments the resiliently biased release part drives a switching member into contact with the first moveable member to move the first moveable member into the open position. Such a switching member may comprise a separate, dedicated, component for acting on the first moveable member to move it into the open position. In a set of embodiments, the switching member is integrally provided with a pivotally mounted arm, mounted within the control unit. The pivotally mounted arm may, for example, extend laterally across the control unit.

In order to ensure that the first moveable member is moved into the open position prior to the electrical disconnection of any conductors in the cordless electrical connector part and corresponding base connector part, the Applicant has recognized that it may be advantageous to amplify the effect of the separation of the cordless electrical connector part and the corresponding base connector part has on the movement of the first moveable member. Accordingly, in embodiments comprising a pivotally mounted arm, optionally, the release part of the release member comprises an angled surface arranged to act on the arm. The Applicant has recognized that as the arm is pivotally mounted, as the release part acts on the latch arm, the latch arm will pivot and also move partially along the release part. Providing the release part with an angled surface will mean that as the arm, e.g. a paddle thereof, moves along the release part, as the release part moves downwards and drives the movement of the arm, the arm will move down the angled surface of the release part which will increase the downwards component of the movement on the arm thus increasing its pivotal movement. In addition, or alternatively, the arm, e.g. the paddle thereof, may be provided with an angled surface which the release part contacts. This may achieve the same effect as that described above.

The control unit may comprise a second moveable electrical contact mounted on a second moveable member mating with a corresponding fixed electrical contact in the electrical power supply circuit when the first moveable member is in a closed position. The resiliently biased release member, may also act in an identical manner to that described above on the second moveable member to provide a further switching function on the second moveable electrical contact and corresponding fixed electrical contact. The control may comprise a second switching member, which may also be independent of the first switching member. However, the Applicant has recognized that it may be advantageous for the release member only to move the first moveable member. Accordingly, in a set of embodiments, the second moveable member is only capable of being moved by the second thermally sensitive actuator. As will be appreciated, in such a set of embodiments, the switching function achieved by the release member moving the first moveable member, and not the second moveable member, results in switching due to separation of the cordless electrical connector part and corresponding base connector part only occurring on one contact pair, i.e. the first moveable electrical contact and corresponding fixed contact. The Applicant has recognized that restricting this switching to one contact pair may reduce the amount of silver required to be used on the electrical contacts and thus reduce the cost of the control.

According to a further aspect of the present invention there is provided a liquid heating appliance comprising a vessel with a heated base and a control, as described above, mounted under the heated base. The control may be mounted to bring the first and second thermally sensitive actuators into good thermal contact with the heated base. A thermal diffuser plate may optionally be included between the thermally sensitive actuators and the heated base. The heated base may be heated by any suitable heater connected to the electrical power supply circuit, for example a sheathed electrical heating element or a thick film heating element.

The liquid heating appliance may be seated on a power base unit comprising the corresponding base electrical connector part.

According to a second aspect of the present invention there is provided a method of making a thermally sensitive control, comprising: forming a control body; forming a cordless electrical connector part in the control body; forming one or more mounting features in the control body for pivotal mounting of a latch arm; forming one or more mounting features in the control body for positioning a release member and forming an aperture in the cordless electrical connector part to receive a plunger of the release member; mounting first and second moveable members to the control body to carry first and second moveable electrical contacts; mounting first and second thermally sensitive actuators to be operable to move the first and second moveable members upon detecting an overheat temperature; and deciding whether to mount a latch arm and release member to the control body to optionally provide the control with a lift-off-reset function.

As is discussed above, by forming the mounting features in the control body, the same control body can be used to manufacture both LOR and non-LOR versions of the thermally sensitive control. The control manufacturer can decide whether to mount a latch arm and release member to the control body to optionally provide the control with a lift-off-reset function.

According to a further aspect of the invention there is provided a kit of parts comprising: a thermally sensitive control comprising: a control body; a thermally sensitive control for controlling an electrical power supply circuit to a heater in a liquid heating appliance, the control comprising: a cordless electrical connector part arranged to mate with a corresponding base electrical connector part; first and second moveable electrical contacts mounted on first and second moveable members, each mating with a corresponding fixed electrical contact in the electrical power supply circuit when the first and second moveable members are respectively in a closed position; first and second thermally sensitive actuators, each independently operable at an overheat temperature to move a respective one of the first and second moveable members from the closed position to an open position wherein the first and second moveable electrical contacts are separated from the fixed electrical contacts to interrupt the electrical power supply circuit; at least one latch arm mounting feature on the control body for mounting a pivotally mounted latch arm extending laterally across the control between the first and second moveable members, at least one release member mounting feature on the control body for positioning a release member; a latch arm comprising a first latch for the first moveable member and a second latch for the second moveable member, optionally mountable to the latch arm mounting feature; and a release member comprising a release part and a plunger wherein the release member is optionally mountable to the release member mounting feature so as to be resiliently biased to bring the release part into contact with the latch arm but the resilient bias is overcome when the plunger bears against a surface of the corresponding base connector part, such that when the latch arm and release member are mounted, when the cordless electrical connector part is mated with the corresponding base electrical connector part, and when at least one of the first and second moveable members is moved towards the open position, such movement causes the latch arm to pivot so that the respective first or second moveable member moves past the respective first or second latch before the latch arm pivots back to adopt a latching position, in which the first or second latch can prevent the respective first and second moveable member from subsequently moving from the open position back to the closed position; and wherein, when the cordless electrical connector part is separated from the corresponding base electrical connector part, the release part is resiliently biased into contact with the latch arm, thereby causing the latch arm to pivot out of the latching position such that the first and/or second moveable member is no longer prevented from moving from the open position back to the closed position.

Any of the features of the aspects and embodiments described above may also be applied to this further aspect of the invention.

BRIEF DESCRIPTION OF THE DRAWINGS

Some preferred embodiments will now be described, by way of example only, and with reference to the accompanying drawings, in which:

FIG. 1 is a bottom perspective view of a control according to a first embodiment;

FIG. 3 is a top perspective view of the control of FIG. 1 with the thermally sensitive actuators and their mounting plate removed;

FIGS. 8A to 8C show the control of FIG. 1 when separated from the corresponding base electrical connector part, FIG. 8A being a partial perspective view of some main components of the control, FIG. 8B being a partial side view of some main components of the control, and FIG. 8C showing one of the moveable members in a closed position when the control has undergone reset;

FIG. 13 is a perspective view of the control seen in FIG. 11 with the main body and mounting plate removed;

FIG. 14 is a perspective view of the arm;

FIG. 27 shows a view from an underside of the kettle seen in FIG. 26, with an outer body and base cover removed.

DETAILED DESCRIPTION

Figure 2A:
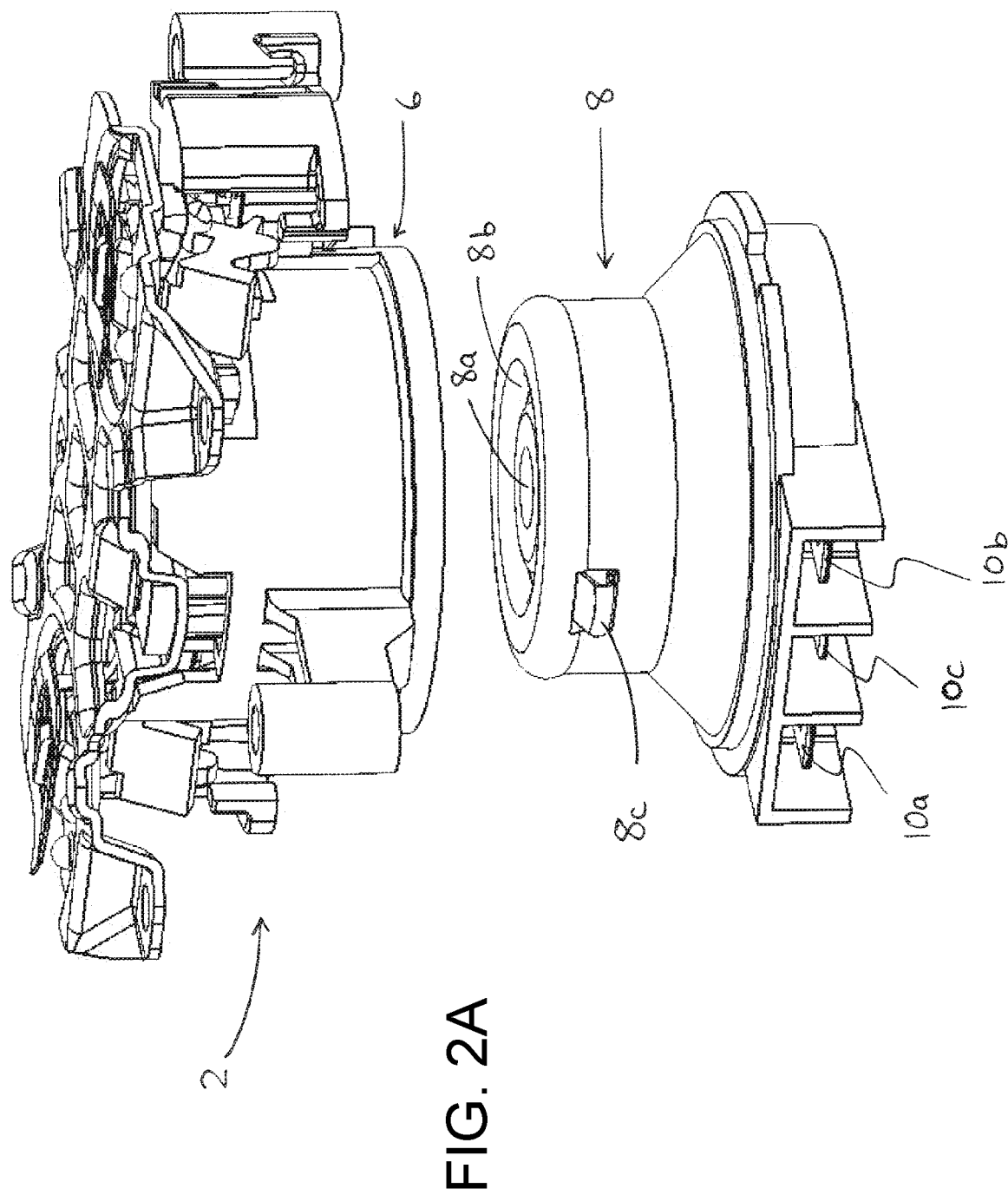
FIGS. 2A and 2B are side perspective views of the control according to the first embodiment before and after mating with a corresponding base electrical connector part in use.

There is seen in FIGS. 1 to 8 a first embodiment of a thermally sensitive control 2 for controlling an electrical power supply circuit to a heater in a liquid heating appliance. The control 2 has a molded plastics control body 4 in which there is formed a cordless electrical connector part 6 on its bottom side. In this embodiment the cordless electrical connector part 6 is a 3-pole connector comprising a live pin 6a, neutral ring conductor 6b and earth ring 6c. Further details may be found in WO95/08204, the content of which publication is hereby incorporated by reference in its entirety.

Figure 2B:
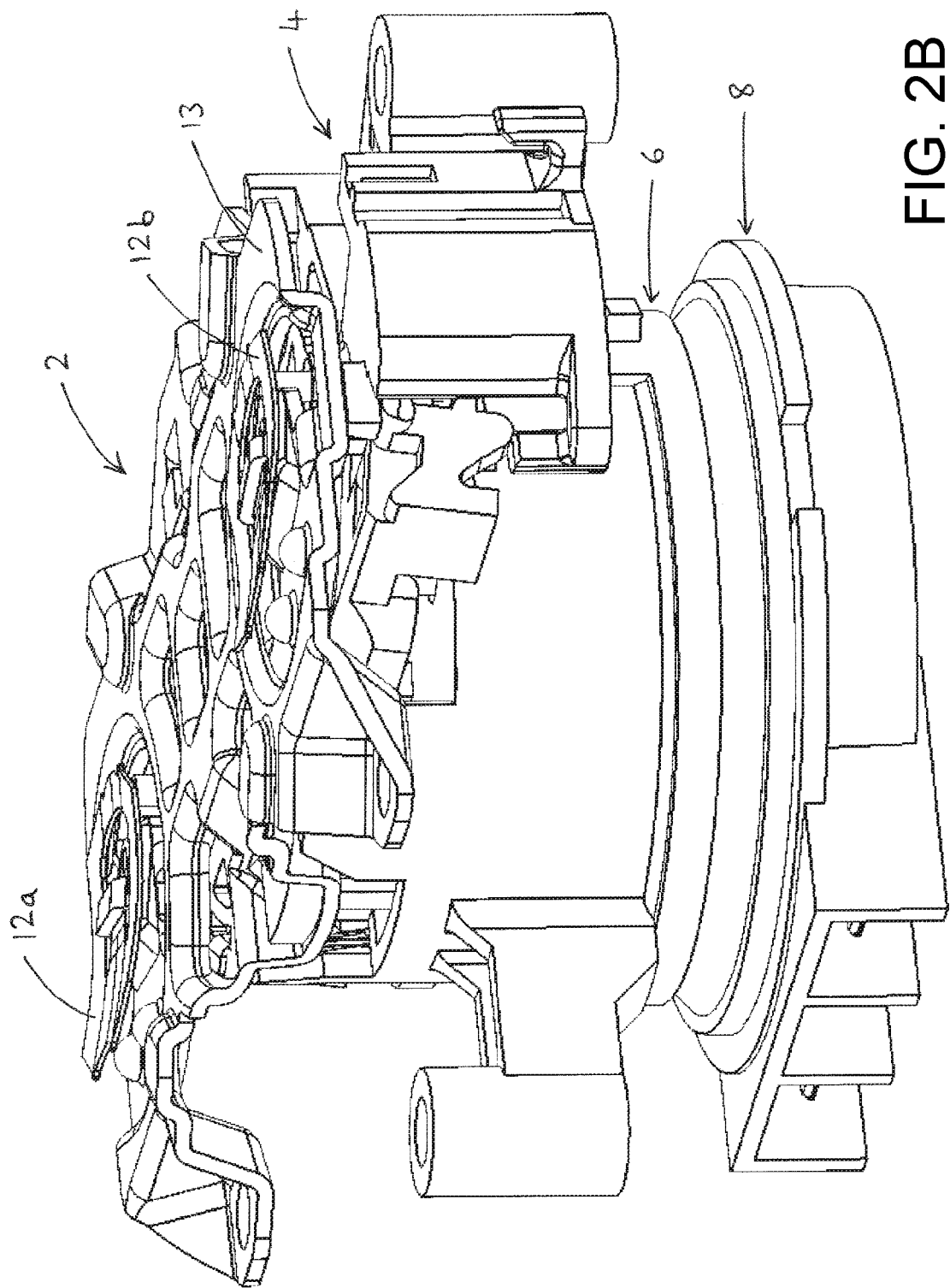

FIGS. 2A and 2B show how the cordless electrical connector part 6 is mated with a corresponding base electrical connector part 8, in use, to complete an electrical power supply circuit e.g. from a mains electrical power supply. The base electrical connector part 8 comprises a central aperture 8a to receive the live pin 6a, a coaxial annular aperture 8b to receive the neutral ring conductor 6b, and an earth tab 8c to contact the earth ring 6c. Electrical contacts housed in the apertures 8a, 8b contact the live pin 6a and neutral ring conductor 6b, respectively, to connect the live and neutral poles of the power supply circuit when the connector parts 6, 8 are brought together. Conductive tabs 10a, 10b allow an electrical connection to be made to the live and neutral contacts, and a conductive tab 10c allow an electrical connection to be made to the earth tab 8c, for example when the base electrical connector part 8 is assembled with an electrical power supply cable. Although not shown, it will be appreciated that the base electrical connector part 8 may be mounted to an appliance power base e.g. in an upstanding manner.

With reference to FIG. 2B, it can be seen that the control 2 includes a pair of first and second thermally sensitive actuators 12a, 12b supported by a metal mounting plate 13 fixed on the top side of the control body 4. In this embodiment the thermally sensitive actuators 12a, 12b are snap-action bimetallic actuators, each set to operate independently at an overheat temperature. In FIG. 3 the thermally sensitive actuators and their mounting plate have been removed to make visible the other components mounted to the control body 4. Firstly, it can be seen that positioned below the actuators 12a, 12b there are two push rods 14a, 14b which pass vertically down through the control body 4 to contact respective first and second moveable members 16a, 16b. The first and second moveable members 16a, 16b are leaf springs that are flexed downwardly when acted upon by the push rods 14a, 14b. With reference to FIG. 1, one of the leaf springs 16a is connected to the live pin 6a and another of the leaf springs 16b is connected to the neutral ring 6b. Within the control body 4, and hence not clearly visible, the first and second moveable members 16a, 16b mount first and second moveable electrical contacts that each mate with a corresponding fixed electrical contact carried by fixed tabs 18a, 18b. As is known in the art, flying leads or other electrical connections can be made to the fixed tabs 18a, 18b to connect the electrical power supply circuit to a heater in an appliance. Secondly, it can be seen that the control 2 is provided with a lift-off-reset (LOR) function by additionally mounting a pivoting latch arm 20 and a release member 26 to the control body 4. These LOR components are shown in detail in FIGS. 4A and 4B.

Figure 4A:
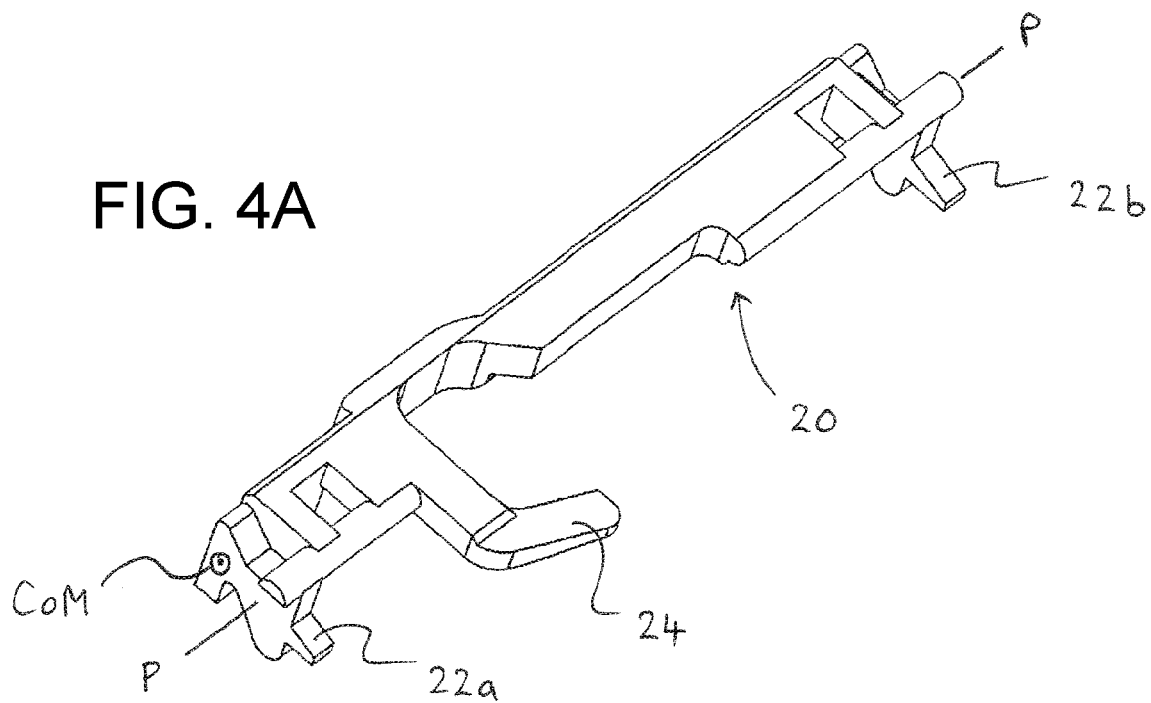
FIG. 4A is a perspective view of the latch arm and FIG. 4B is a perspective view of the spring-biased release member.

Referring to FIG. 4A, the latch arm 20 takes the form of a rigid beam e.g. formed from plastics material. At either end of the latch arm 20 there is a beak-shaped latch 22a, 22b. A pivot axle P extends along the length of the latch arm 20 so that the latch arm 20 can be mounted to mounting features P1, P2 provided on the control body, as seen in FIG. 5. The mounting features P1, P2 are spaced far apart, towards the respective ends of the latch arm 20, to ensure that the pivotal mounting is stable and the latch arm 20 will pivot without torsional effects. Referring again to FIG. 4a, the pivot axle P is laterally offset from the center of mass (CoM) of the latch arm 20, as a result of the material distribution in the latch arm 20. This means that, when a member pushes down on one of the latches 22a, 22b, the latch arm 20 is forced to pivot the CoM further away from the pivot axle P and the action of gravity is to automatically return the latch arm 20 to its rest position whenever possible. The rest position of the latch arm 20 may be defined by a stop part 25 coming into contact with a stop feature on the control body 4.

Figure 4B:
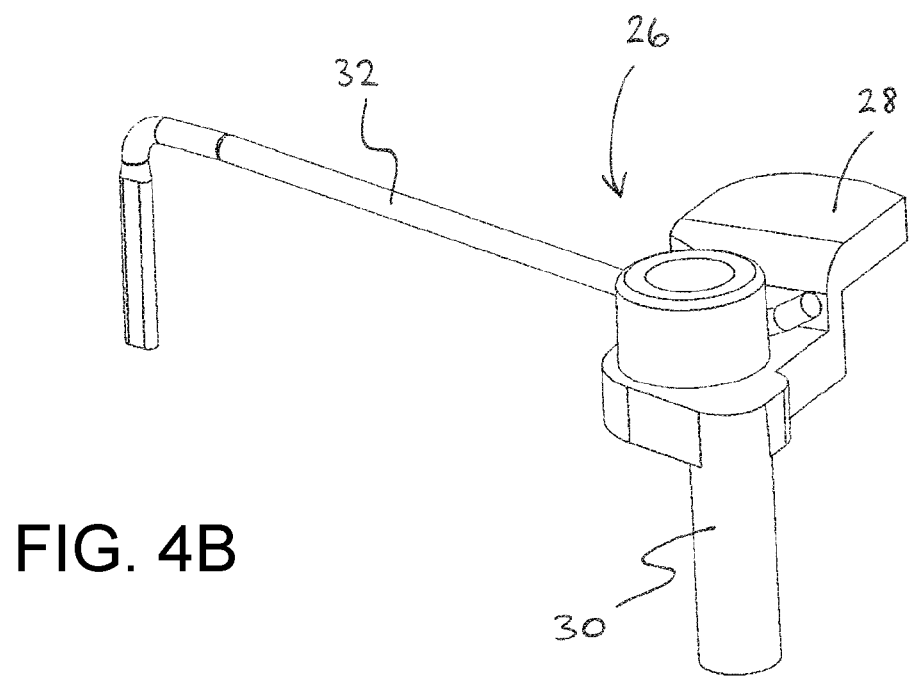

Somewhere along the latch arm 20 there is a paddle 24 projecting laterally for engagement with the release part 28 of the release member 26 seen in FIG. 4B. For example, it can be seen in FIG. 3 that the paddle 24 of the latch arm 20 projects laterally to lie below the release part 28 of the release member 26. Referring to FIG. 4B, the release member 26 also includes a downwardly projecting plunger 30.

Figure 5A:
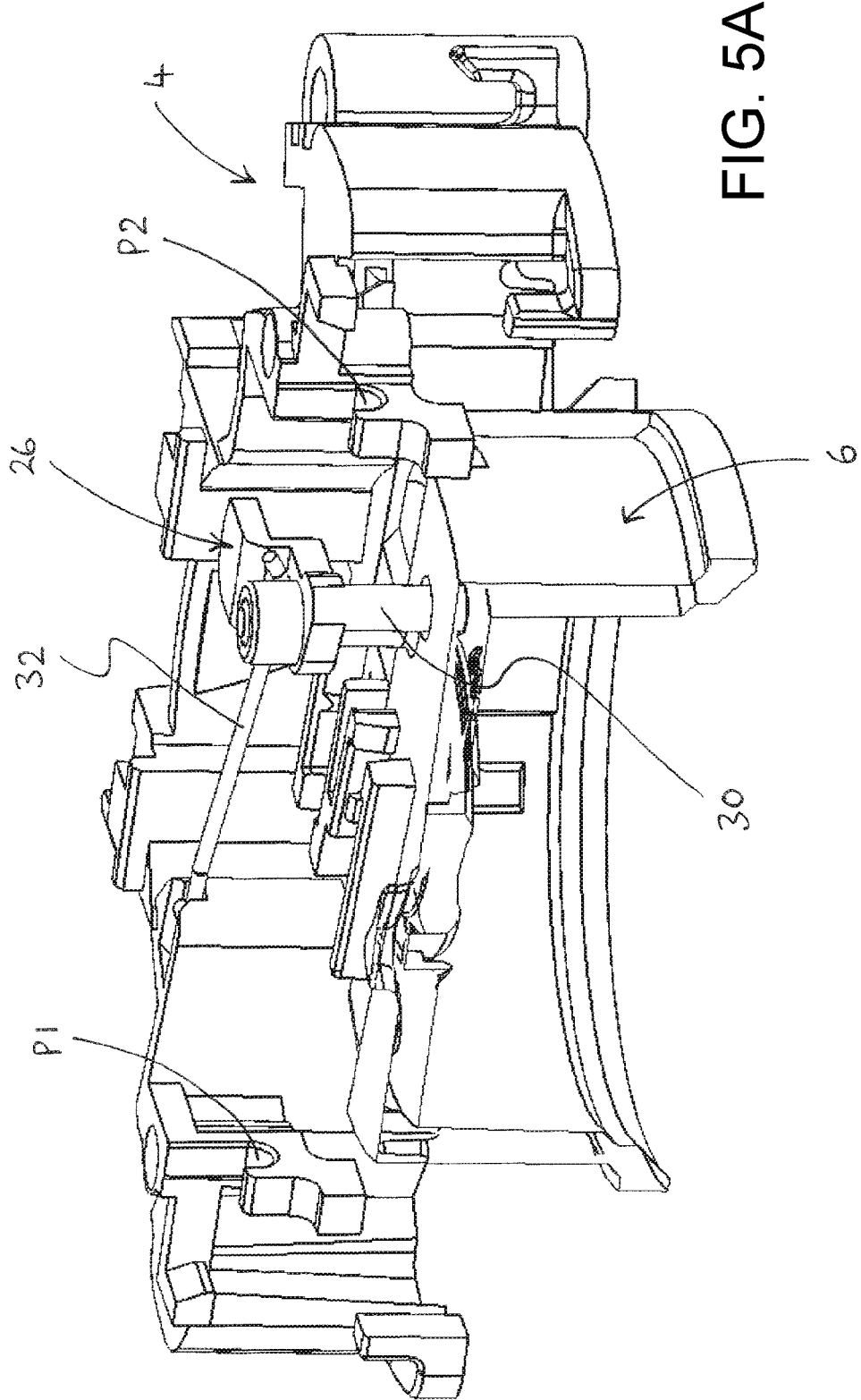
FIG. 5A is a partially cutaway perspective view of the control of FIG. 1, showing the mounting features for the latch arm and the position of the release member when the cordless electrical connector part is mated with a corresponding base electrical connector part (not shown) in use.
Figure 5B:
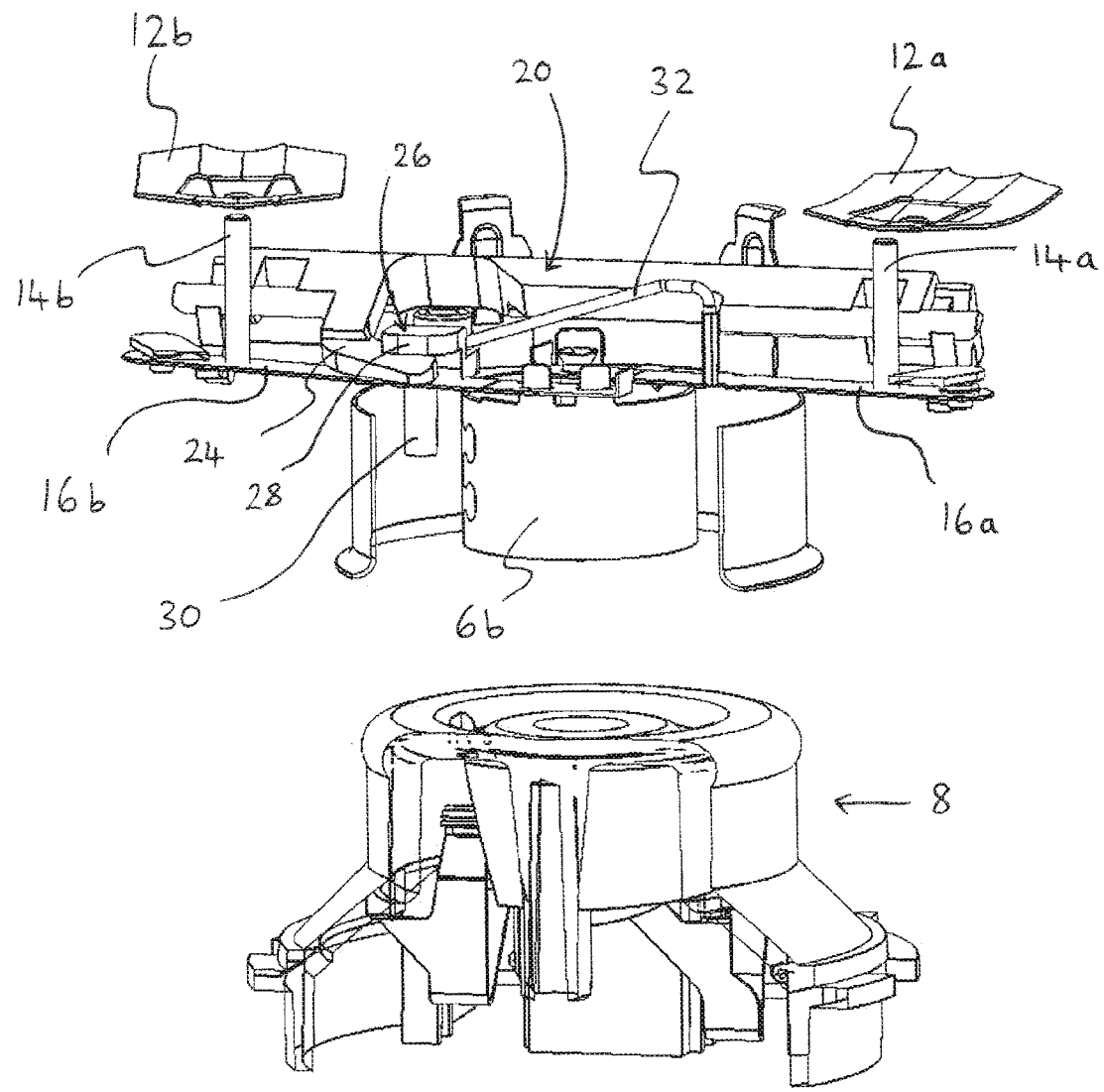
FIG. 5B is another partially cutaway perspective view of the control of FIG. 1, showing the position of the release member when the cordless electrical connector part is separated from a corresponding base electrical connector part in use.

As is seen in FIG. 5A, the plunger 30 projects through a hole in the control body 4 to project downwardly within the cordless electrical connector part 6 and bear against an upper surface of the corresponding base connector part (not shown). The release member 26 is resiliently biased by a wire spring member 32 that is also mounted to the control body 4. As seen in FIG. 5B, the wire spring member 32 tends to bias the release member 26 downwardly to a lower position so that the release part 28 is brought into contact with the underlying paddle 24 of the latch arm 20. However this resilient bias is overcome when the cordless electrical connector part 6 is mated with the corresponding base connector part 8 and the plunger 30 bears against a surface of the corresponding base connector part. This forces the release member 26 to adopt the higher position seen in FIG. 5A.

Figure 6:
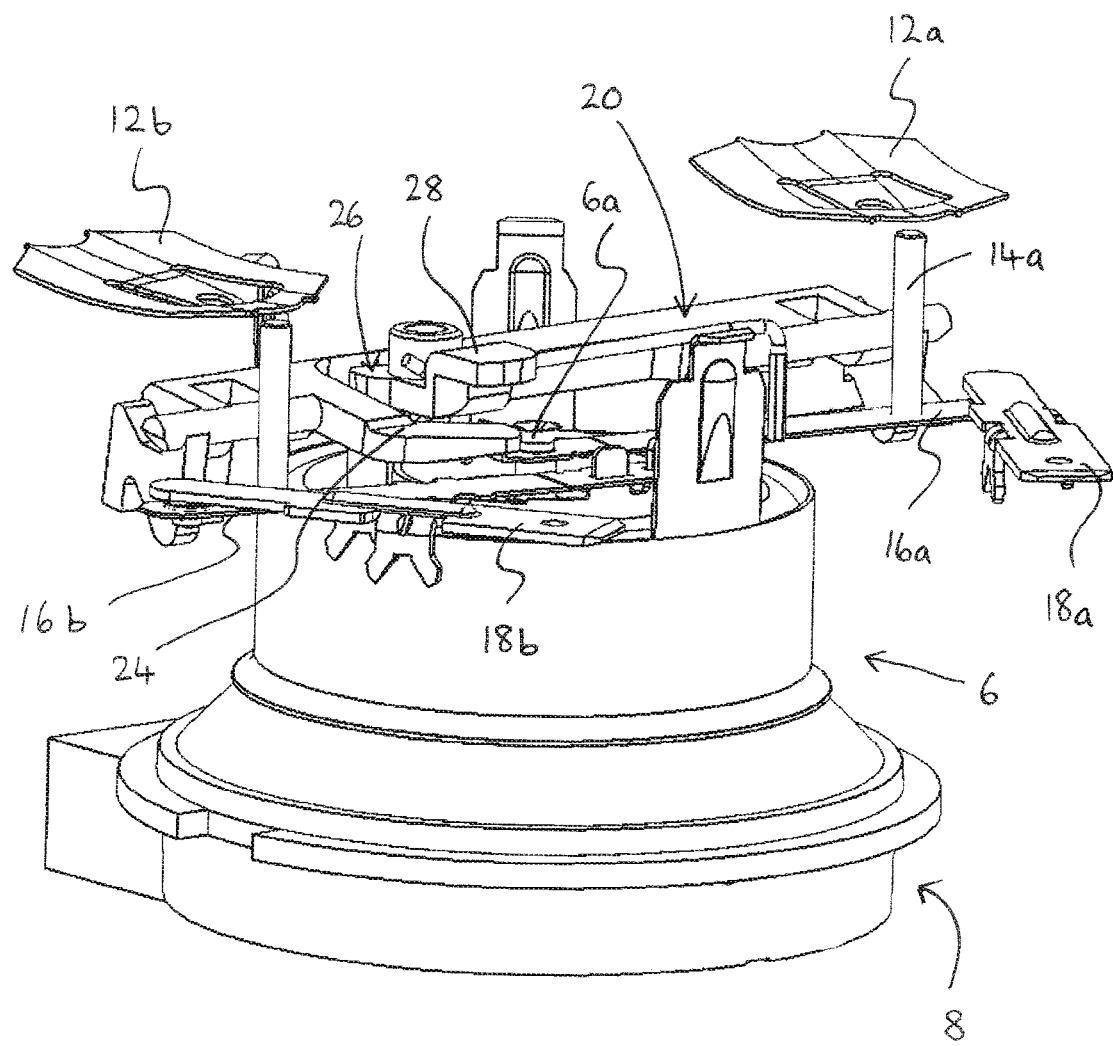
FIG. 6 is a partial perspective view of some main components of the control of FIG. 1, showing the latch arm mounted relative to the moveable members.

Operation of the LOR components in the control 2 will now be explained in more detail with reference to FIGS. 6 to 8. FIG. 6 shows how the latch arm 20 is pivotally mounted to extend laterally across the control 2 between the first and second moveable members 16a, 16b. The latches 22a, 22b are positioned quite close to the ends of the moveable members 16a, 16b so that when the members 16a, 16b flex they act on the latches 22a, 22b with a large range of movement. However, the latches 22a, 22b are positioned so as not to touch the electrical contacts mounted on the moveable members 16a, 16b, to avoid damage to the latch arm 20 from heat or electrical arcing. The first and second bimetallic actuators 12a, 12b are aligned above the first and second moveable members 16a, 16b. When either of the actuators 12a, 12b operates with a snap action, the associated push rod 14a, 14b is forced downwardly to flex the underlying moveable member e.g. leaf spring 16a, 16b. FIG. 6 shows the first and second moveable members 16a, 16b in a closed position in which the electrical contacts pairs are closed. The cordless electrical connector part 6 of the control 2 is mated with a corresponding base electrical connector part 4 so that a current flows through the electrical power supply circuit.

Figure 7A:
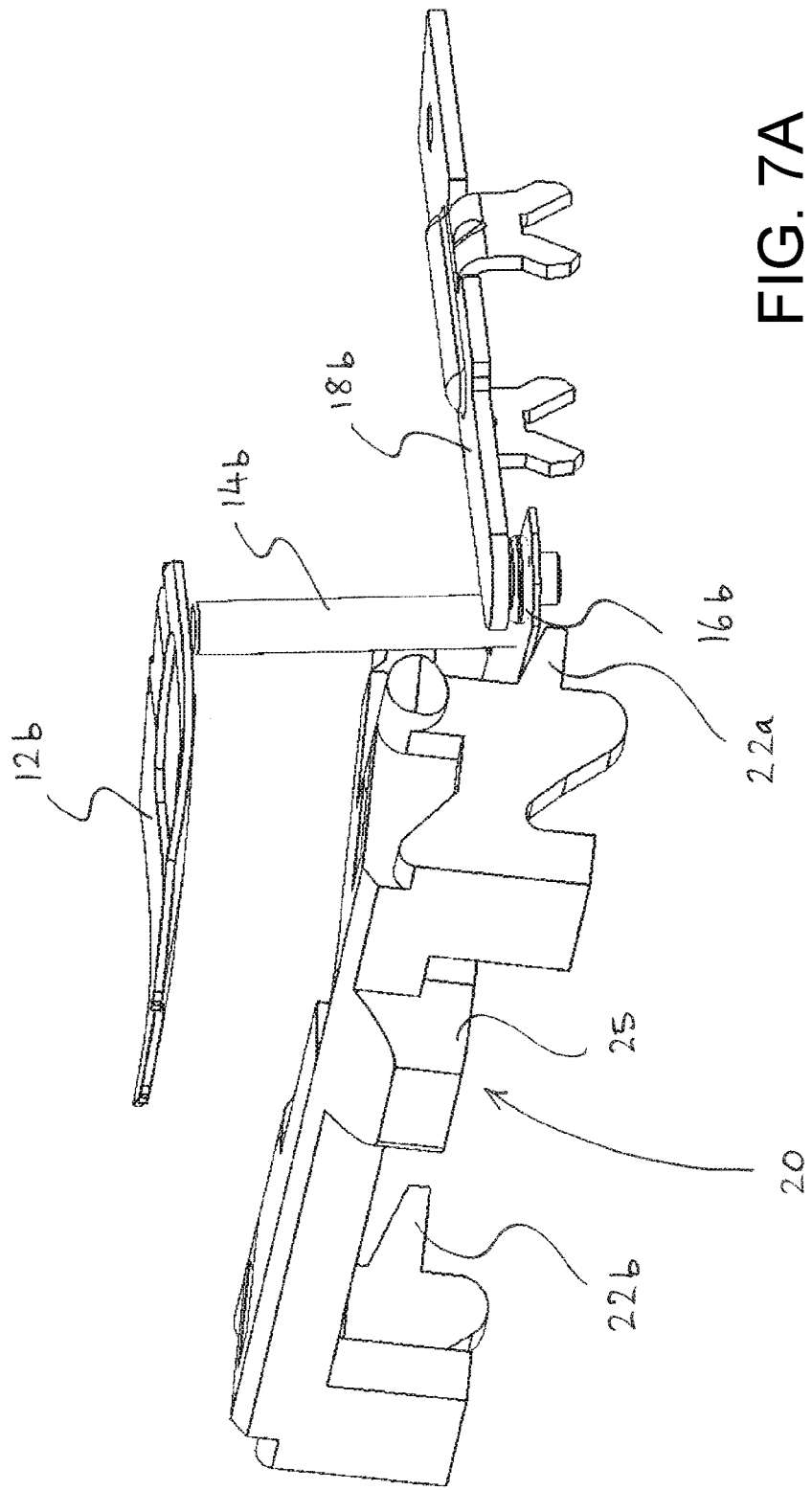
FIG. 7A shows one of the moveable members in a closed position when the control of FIG. 1 is mated with a corresponding base electrical connector part.
Figure 7B:
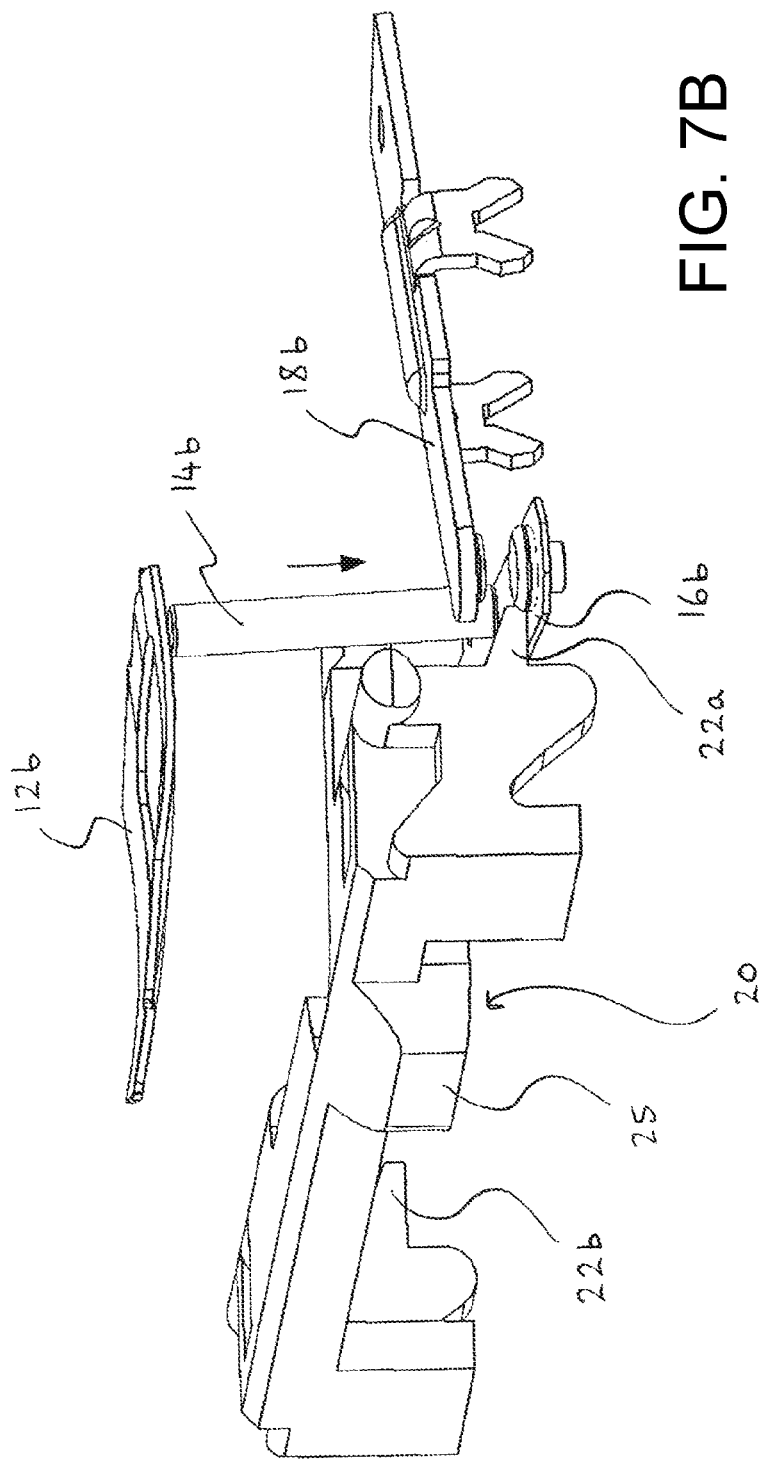
FIG. 7B shows one of the moveable members in an open position when the control of FIG. 1 is still mated with a corresponding base electrical connector part.

FIG. 7A is a close-up view of one of the moveable members 16b in a closed position relative to the fixed tab 18b when the control 2 is mated with a corresponding base electrical connector part. It can also be seen that the latch arm 20 is in a rest position with the first latch 22a positioned below the moveable member 16b. FIG. 7B is a close-up view of the moveable member 16b pushed into an open position by the downwards action of the push rod 14b following operation of the overlying actuator 12b. The electrical contacts are separated as the leaf spring 16b flexes down. The movement of the leaf spring 16b towards the open position, pushing down past the latch 22a, causes the latch arm 20 to pivot until the leaf spring 16b has moved past the latch 22a to the open position seen in FIG. 7B. The latch arm 20 then pivots back under gravity to adopt its original position, which is now a latching position. The range of pivotal movement of the latch arm 20 can be limited by the stop part 25 coming into contact with an associated stop feature on the control body (not shown). With the latch arm 20 in this latching position, it can be seen that the latch 22a will prevent the leaf spring 16b from subsequently flexing back to the closed position even if the push rod 14b returns due to reset of the actuator 12b. This avoids thermal cycling of the heater as long as the control 2 is mated with the base connector part.

Figure 8C:
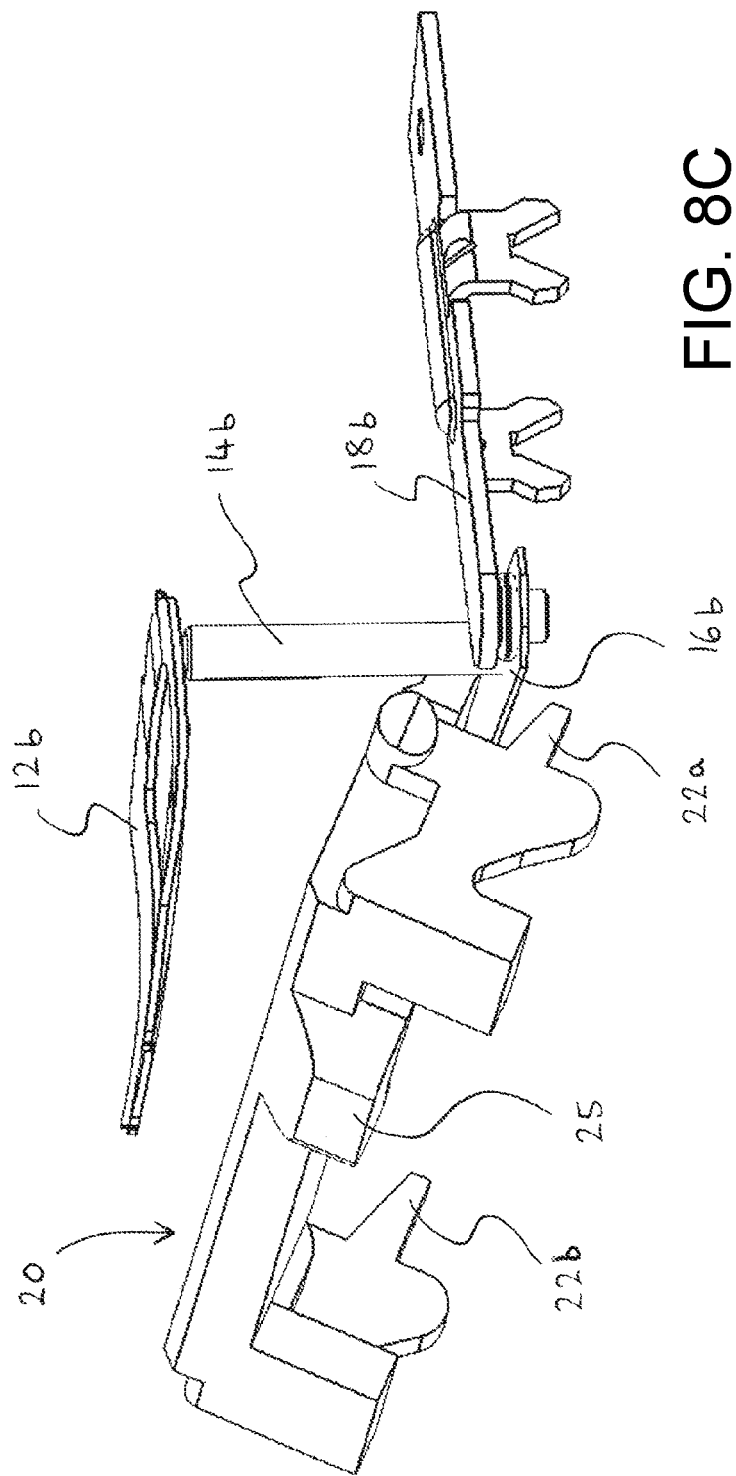

FIGS. 8A to 8C show what happens subsequently when the cordless electrical connector part 6 is separated from the corresponding base electrical connector part 8, i.e. "lift-off". Firstly, FIG. 8a shows how the release member 26 is resiliently biased by the spring member 32 to pull the release part 28 down onto the paddle 24. The downwards force on the paddle 24 causes the latch arm 20 to pivot up around the axle P, out of the latching position, so that the latches 22a, 22b swing away from the leaf springs 16a, 16b. Assuming that the push rods 14a, 14b are no longer pushing down, because one or both of the actuators 12a, 12b have reset, the leaf springs 16a, 16b are now free to move back to the closed position and remake the electrical contact pairs in the power supply circuit. FIGS. 8B and 8C are clearer side views of the latch arm 20 when it has pivoted out of the latching position and electrical contact is remade. Thus "lift-off-reset" has occurred. FIG. 8B shows how the latch arm 20 is forced to pivot back under the force of the resiliently-biased release member to an otherwise unstable position. The stop part 25 is lifted away from the control body until the latch arm 20 is free to pivot down under gravity again. When the control 2 is again mated with a corresponding base electrical connector part, the plunger 30 is pushed up against the resilient bias of the spring member 32 and the release member 26 is no longer in contact with the latch arm, for example as seen in FIGS. 5a and 6. The latch arm 20 pivots back down under gravity to adopt its rest position again.

It will be appreciated that operation of either of the actuators 12a, 12b will cause the latch arm 20 to be moved into its latching position (seen in FIG. 7B). The electrical supply to both the live and neutral poles is prevented from being remade once the latch arm 20 is in its latching position. Such dual-LOR functionality can enable the control 2 to meet compliance with official standards without requiring an additional thermal fuse.

The control 2 with integrated cordless electrical connector part 6 is manufactured by standard techniques. The assembly steps for a LOR version of such a control 2 may be as follows:

1. Pre-assemble the spring member 32 with the release member 26 (optional);
2. Mount latch arm 20 to control body 4;
3. Mount release member 26 and spring member 32 to control body 4;
4. Insert push rods 14a, 14b through holes in control body;
5. Fix mounting plate 13 to control body 4 and mount bimetallic actuators 12a, 12b.

A non-LOR version of the control may be made by omitting assembly steps 1-3.

Figure 9:
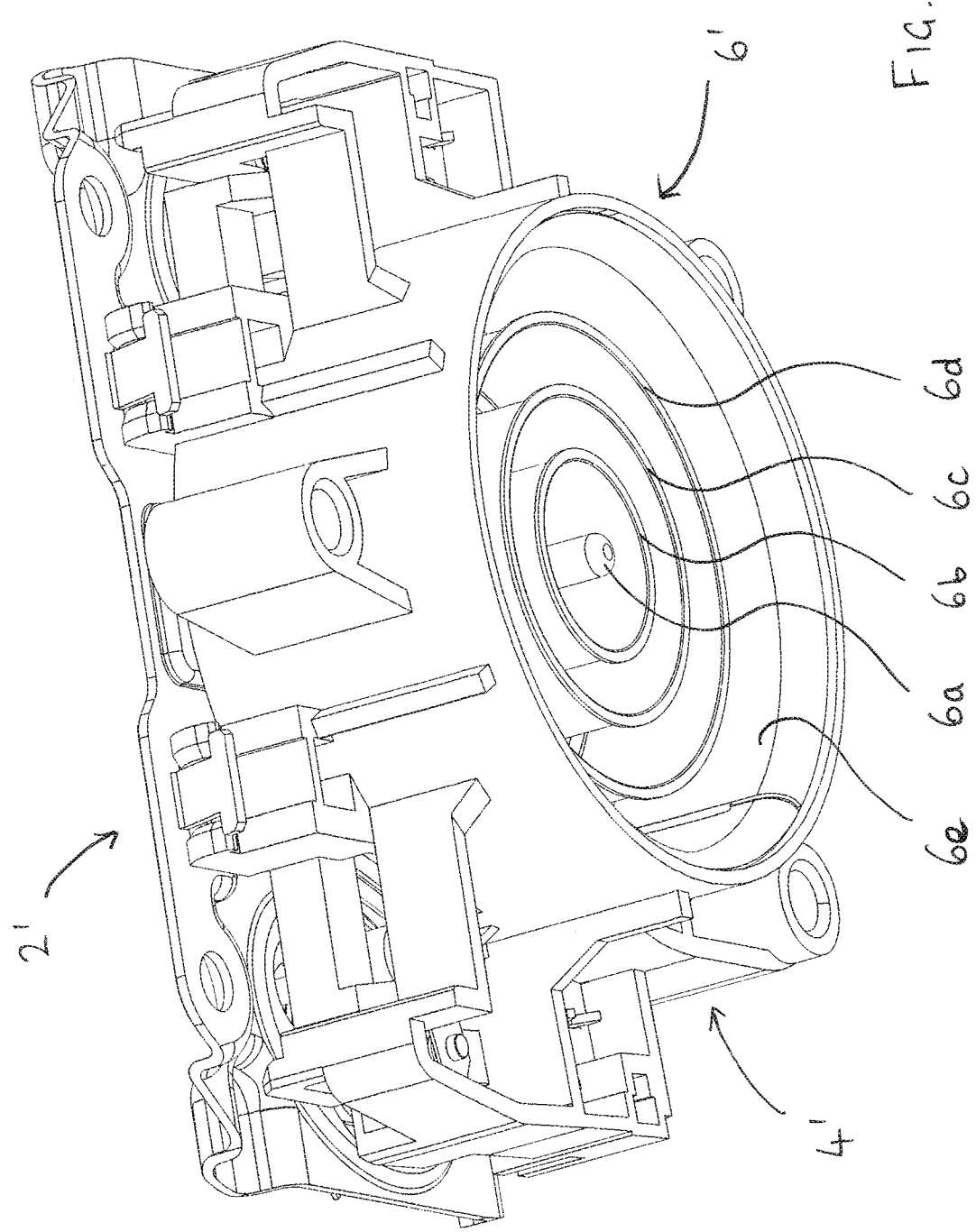
FIG. 9 is a bottom perspective view of a control according to a second embodiment.
Figure 10:
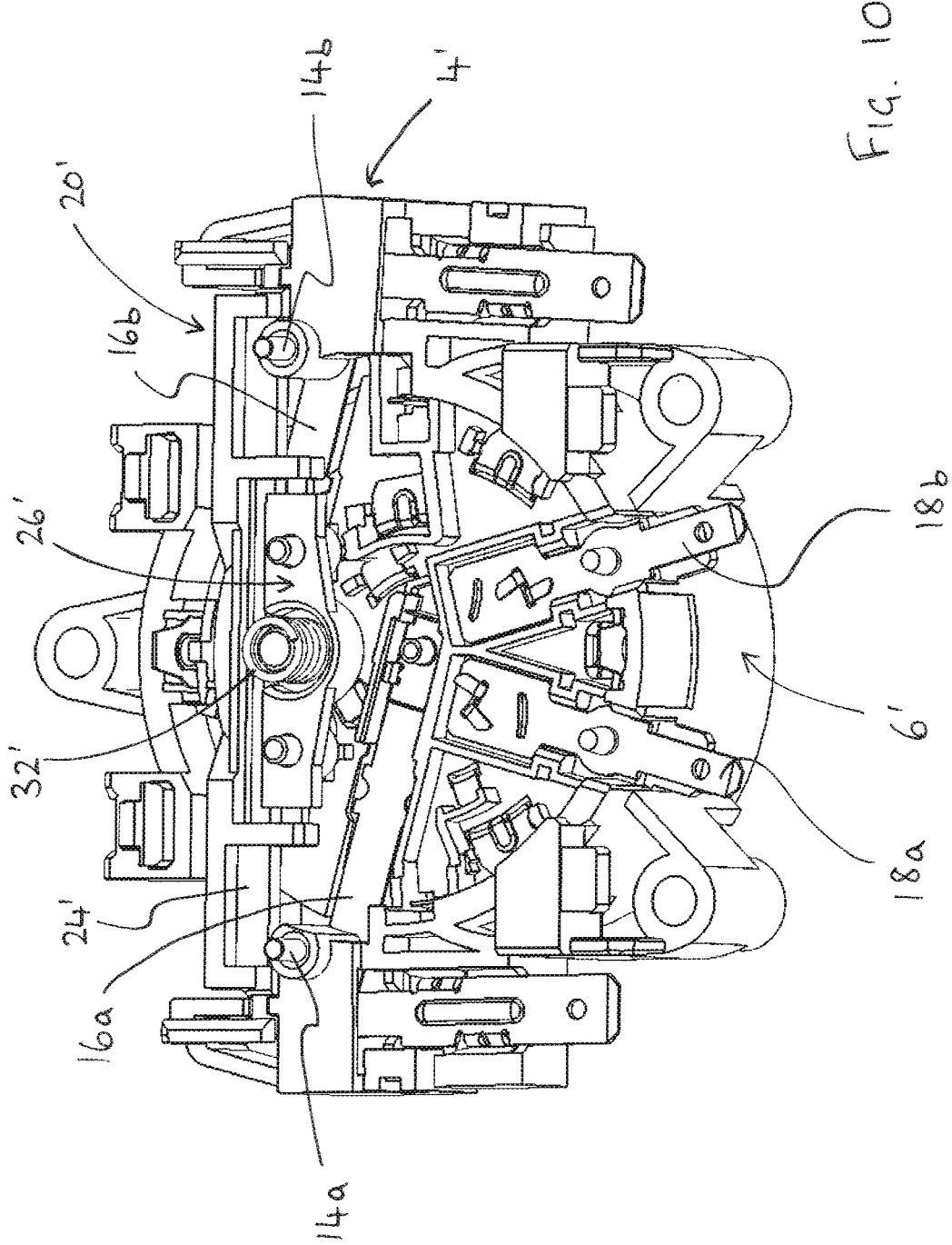
FIG. 10 is a top perspective view of the control of FIG. 9 with the thermally sensitive actuators and their mounting plate removed.

FIGS. 9 and 10 show a second embodiment of a thermally sensitive control 2' for controlling an electrical power supply circuit to a heater in a liquid heating appliance. The control 2' has a molded plastics control body 4' in which there is formed a cordless electrical connector part 6' on its bottom side. In this embodiment the cordless electrical connector part 6' is a 5-pole connector comprising a live pin 6a, three coaxial conductor rings 6b, 6c, 6d, and an outer earth ring 6e. Further details of such a 5-pole connector may be found in WO01/28294, the content of which publication is hereby incorporated by reference in its entirety.

As will be appreciated from comparing FIG. 9 with FIG. 1, and FIG. 10 with FIG. 3, the control 2' has a different control body 4' and cordless electrical connector part 6', but otherwise the LOR components (labelled with the same reference numbers) are substantially unchanged. As before, the latch arm 20' takes the form of a rigid beam e.g. formed from plastics material, mounted to the control body 4' with a pivot axle that is laterally offset from the center of mass (CoM) of the latch arm 20'. The latch arm 20' has a slightly different shape, with a paddle 24' projecting laterally from the latch arm 20' for engagement beneath a centrally positioned release member 26'. As before, the release member 26' also includes a plunger projecting downwardly through a hole in the control body 4' into the cordless electrical connector part 6' so as to bear against an upper surface of the corresponding base connector part when mated together. In this embodiment, the release member 26' is resiliently biased by a coil spring member 32'. Apart from these slight constructional variations, the control 2' operates in the same way as is described above.

Figure 11:
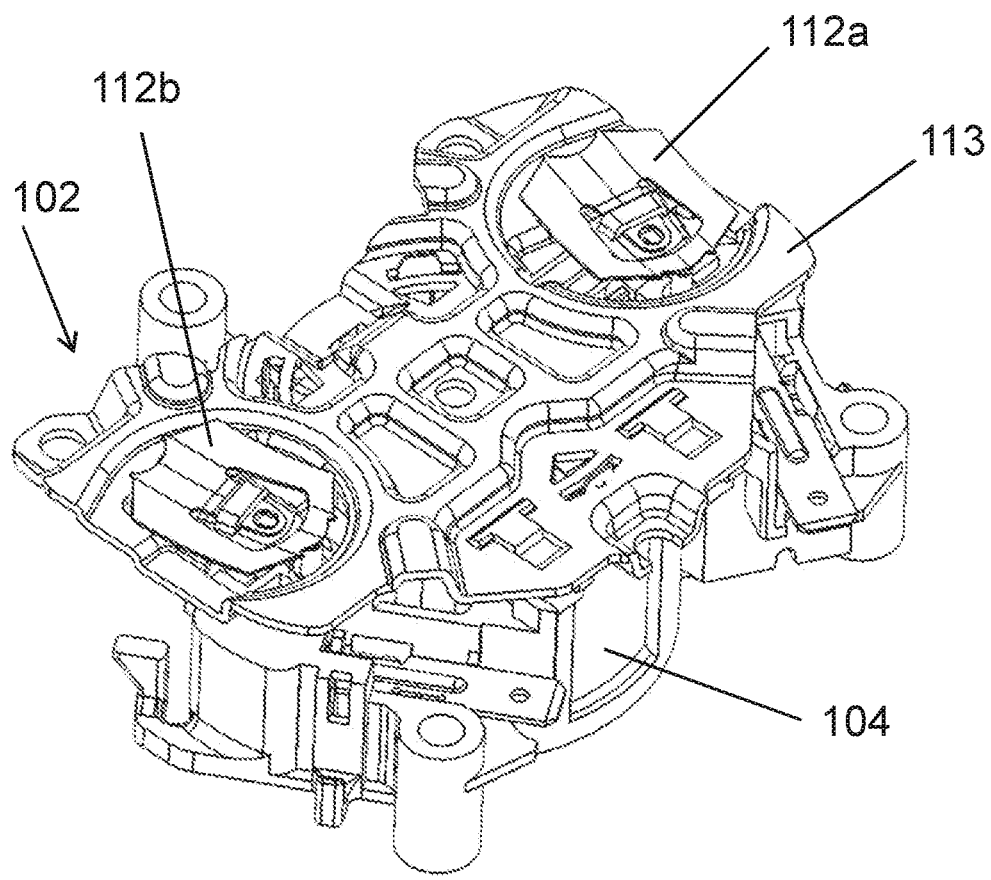
FIG. 11 is a top perspective view of a control according to a third embodiment.

FIGS. 11-25 show a third embodiment of a thermally sensitive control 102 for controlling an electrical power supply circuit to a heater in a liquid heating appliance. FIG. 11 shows a perspective view of the thermally sensitive control 102. The thermally sensitive control 102 is the same as the control 2 seen in FIGS. 1-8, except that in the control 102 the release member (not seen in this Figure) is also capable of moving the first moveable member (not seen in this Figure) in order to break the electrical circuit when the control 102 is separated from a base connector part 8 (not shown in this Figure). Only features of this third embodiment which relate to the release member's ability to break the electrical circuit will be described in the following drawings. As can be seen in FIG. 11, the control 102 comprises a plastics body 104 and a metal mounting plate 113 to which various components are mounted. Similarly to the first embodiment, the control 102 comprises a pair of first and second thermally sensitive actuators 112a, 112b.

Figure 12:
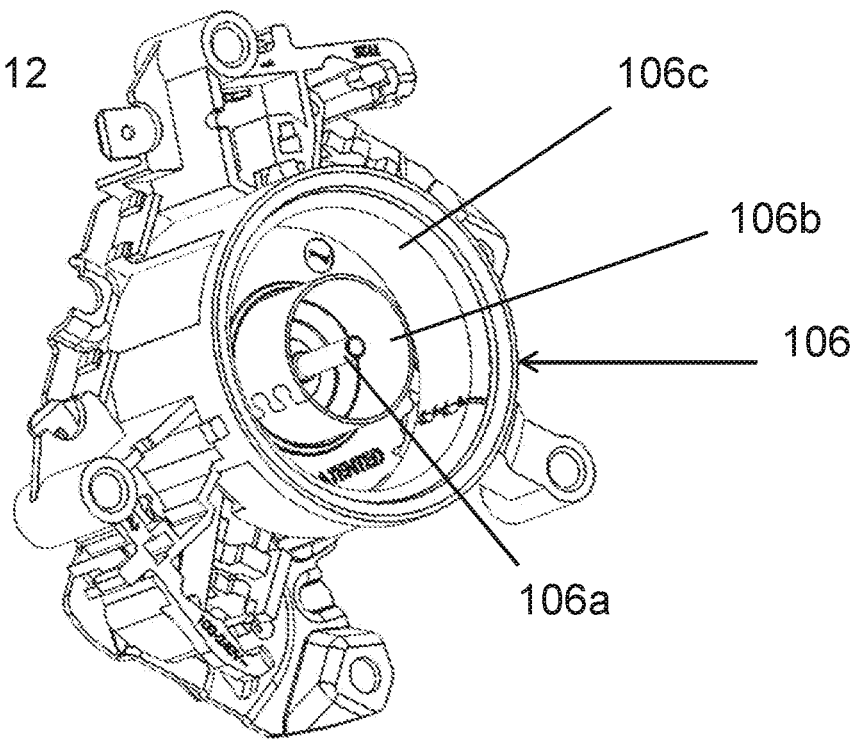
FIG. 12 is an underside perspective view of the control seen in FIG. 11.

FIG. 12 shows a perspective view from the underside of the control showing its cordless electrical connector part 106 in the form of a 3-pole connector comprising a live pin 106a, neutral ring 106b and earth ring 106c.

In FIG. 13, the body 104 and mounting plate 113 have been removed to make visible the other components of the control 102. The control 102 is similar to the control of the first embodiment and comprises two push rods 114a, 114b, positioned below the actuators 112a, 112b, which contact first and second moveable members 116a, 116b. The first and second moveable members 116a, 116b are leaf springs that are flexed downwardly when acted upon by the push rods 114a, 114b. With reference to FIG. 12, one of the leaf springs 116a is connected to the live pin 106a and the other leaf spring 116b is connected to the neutral ring 106b. The first and second moveable members 116a, 116b mount first and second electrical contacts that each mate with a corresponding fixed electrical contact carried by fixed tabs 118a, 118b. As is known in the art, flying leads or other electrical connections can be made to the fixed tabs 118a, 118b to connect the electrical power supply circuit to a heater in an appliance. The control also comprises a pivoting arm 120 which provides a latching function to provide a lift-off-reset (LOR) function, as with the first embodiment, in combination with a release member 126. The release member 126 comprises a release part 128. The release member 126 also comprises a plunger (not visible in this Figure) which is identical to that seen in the first embodiment.

Referring to FIG. 14, the arm 120 takes the form of a rigid beam, e.g. formed from plastics material. At either end of the arm 120 there is a beak-shaped latch 122a, 122b. A pivot axle P extends along the length of the arm 120 so that the arm 120 can be mounted in the same way as the embodiment seen in FIG. 1. The pivot axle P is laterally offset from the center of mass (CoM) of the arm 120, as a result of the material distribution of the arm 120. This means that, when a member pushes down on the latches 122a, 122b, the arm 120 is forced to pivot the CoM further away from the pivot axle P and the action of gravity is to automatically return the arm 120 to its rest position whenever possible. The rest position of the arm 120 may be defined by a stop part coming into contact with a stop feature on the control body 104.

Somewhere along the arm 120 there is a paddle 124 projecting laterally for engagement with the release part 128 of the release member 126 seen in FIG. 13. For example, it can be seen in FIG. 13 that the paddle 124 of the arm 120 projects laterally to lie below the release part 128 of the release member 126.

The pivoting arm 120 provides a LOR function in the exact manner described above with respect to FIGS. 1-8.

The arm 120 further comprises a switching member 134 extending from the arm 120. Referring back to FIG. 13, the arm 120 is mounted in the control 102 such that the switching member 134 is arranged to come into contact with the second moveable member 116b. When the release member 126, specifically the release part 128, acts on the paddle 124, this will cause the arm 120 to pivot, and will drive the switching member 134 into the second moveable member 116b thereby moving it away from the fixed tab 118b thus separating the electrical contacts mounted on each of the second moveable member 116b and fixed tab 118b. Accordingly, as will be appreciated by those skilled in the art, the arm 120 is provided with both latches 122a, 122b and the switching member 134 and thus provides a dual function.

Figure 15:
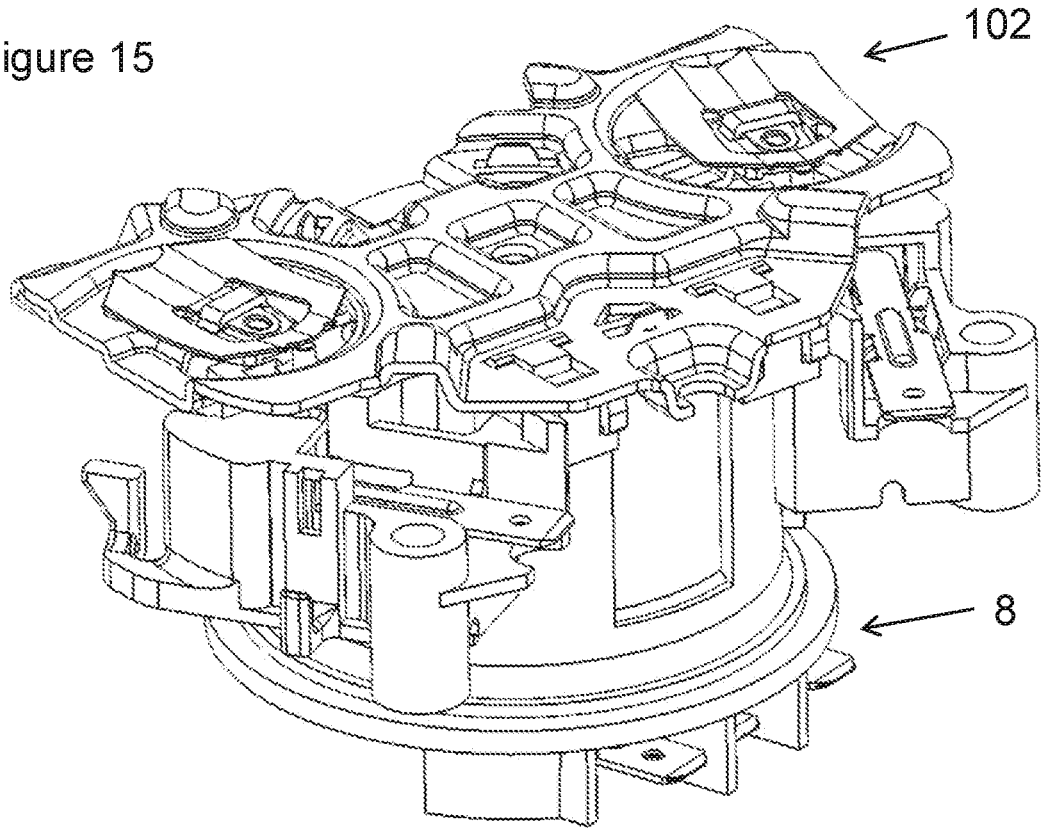
FIG. 15 shows a perspective view of the control seen in FIG. 11 mated with a corresponding base connector part.
Figure 16:
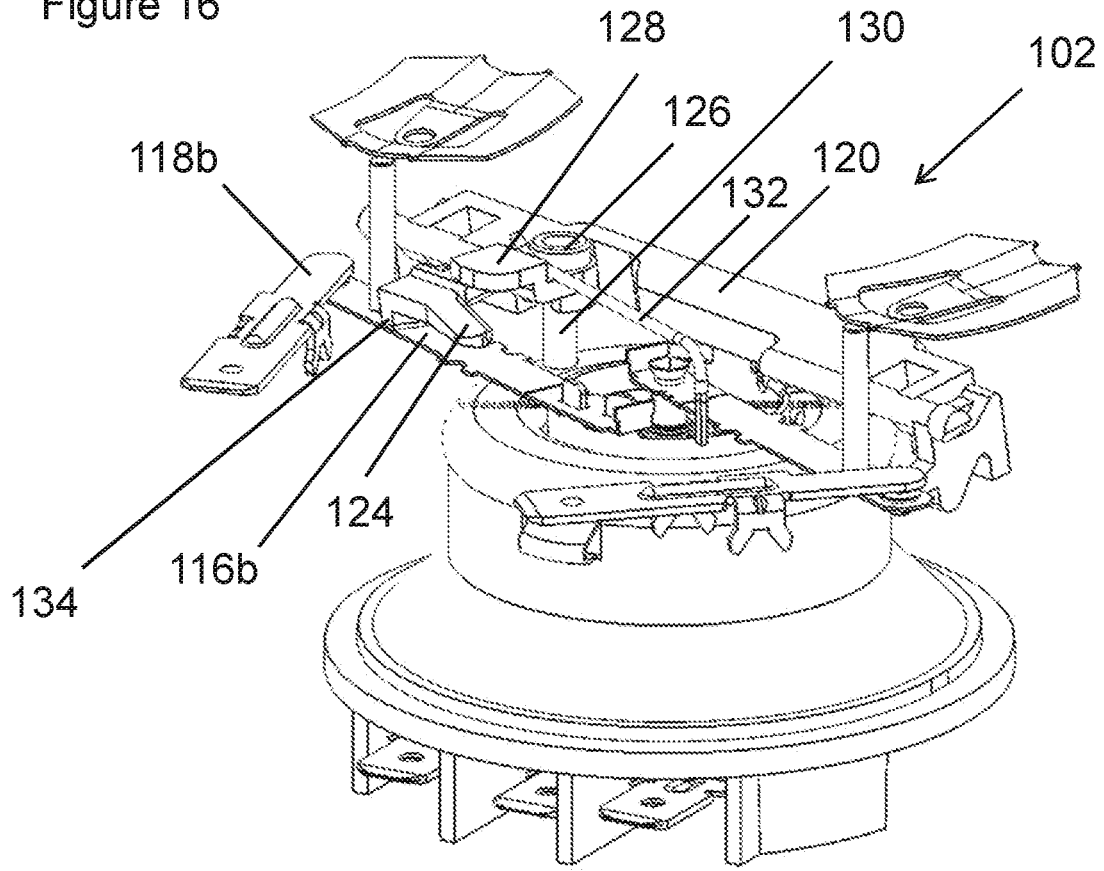
FIG. 16 shows a perspective view of the control seen in FIG. 11 mated with a corresponding base connector part with the main body and mount plate removed.

FIG. 15 shows a perspective view of the control 102 fully mated with the base connector part 8 to complete an electrical power supply circuit e.g. from a mains electrical power supply. FIG. 16 shows the control 102 and base connector part 8, mated together as seen in FIG. 15, with the plastic body 104, mount plate 113, neutral ring 106b and earth ring 106c removed in order to more clearly show the inner components of the control 102. In this fully mated state, the electrical contacts within the annular aperture 8a, coaxial annular aperture 8b, and the earth tab 8c of the base connector part 8, as seen for example in FIG. 2a, will contact each of the live pin 106a, neutral ring conductor 106b and the earth ring 106c, respectively. In the fully mated state, the base connector part 8 also pushes, and holds, the plunger 130 upwards, overcoming the resilient bias provided by the wire spring 132, thereby holding the release member 126 away from the paddle 124. As a result, the arm 120 is free to pivot and may function to latch in the manner described above with respect to FIGS. 1-8. As described above, the arm 120 further comprises the switching member 134. With the base connector part 8 fully mated with the control 102, the release member 126 is held away from the arm 120 and so the release member 126 does not drive any movement of the arm 120. Accordingly, the arm 120, specifically the switching member 134 thereon, does not cause the second moveable member 116b to separate from the fixed tab 118b.

Figure 17:
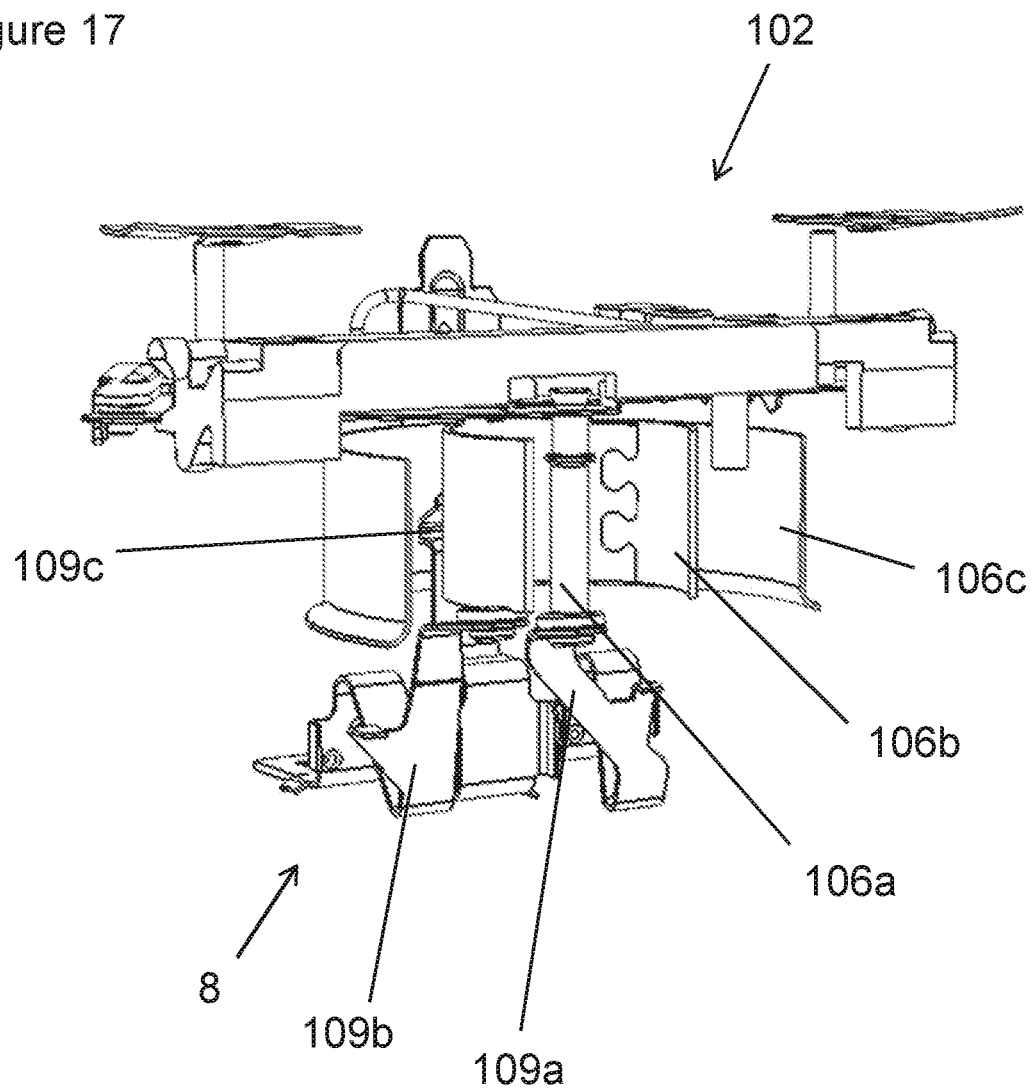
FIG. 17 shows a partially cut-away view of the control seen in FIG. 11.

FIG. 17 shows a partially cut-away view through the control 102 and base connector part 8, with the outer plastic body of the base connector part 8 removed to reveal its live contact 109a, its neutral contact 109b, and earth contact 109c. As can be seen in this view, with the control 102 and base connector part 8 fully mated, the live contact 109a, neutral contact 109b, and earth contact 109c, are respectively in contact with the live pin 106a, neutral ring 106b and earth ring 106c.

Figure 18:
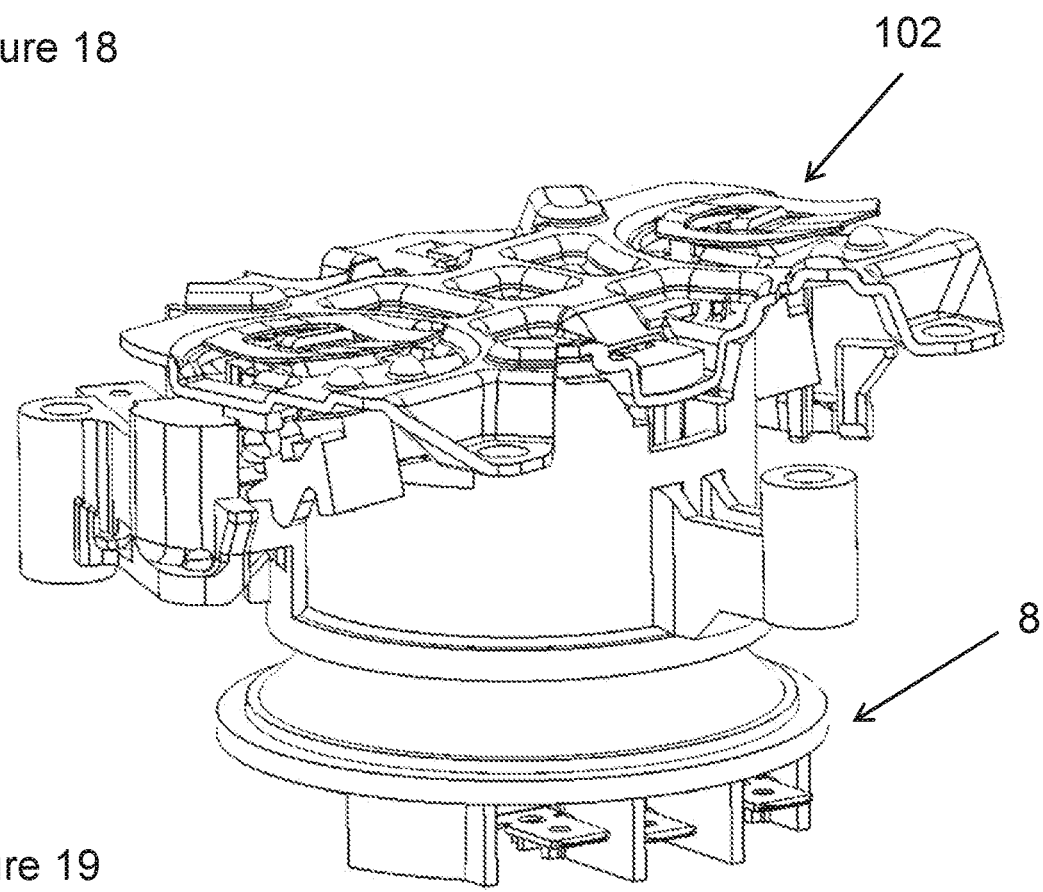
FIG. 18 shows a perspective view of the control seen in FIG. 11 partially separated from a corresponding base connector part.

FIG. 18 shows a perspective view of the control 102 partially separated from the base connector part 8, e.g. due to a user partially lifting an appliance comprising the control 102 away from the base on which it rests.

Figure 19:
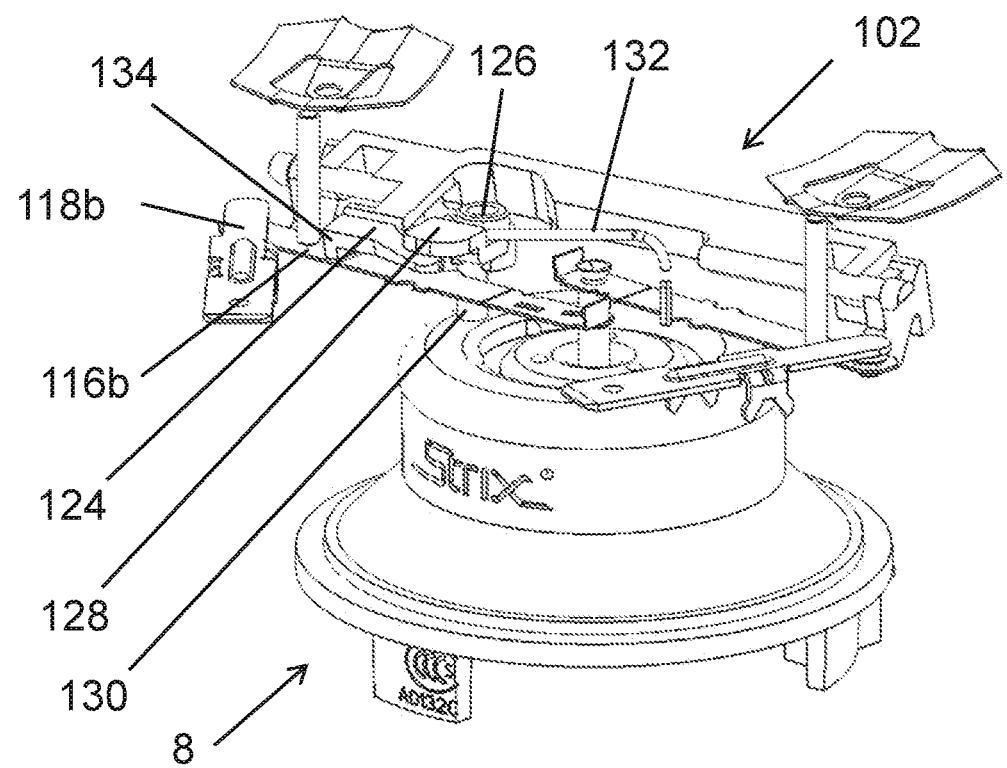
FIG. 19. shows a perspective view of the control seen in FIG. 11 partially separated from the corresponding base connector part with the main body and mount plate removed.
Figure 20:
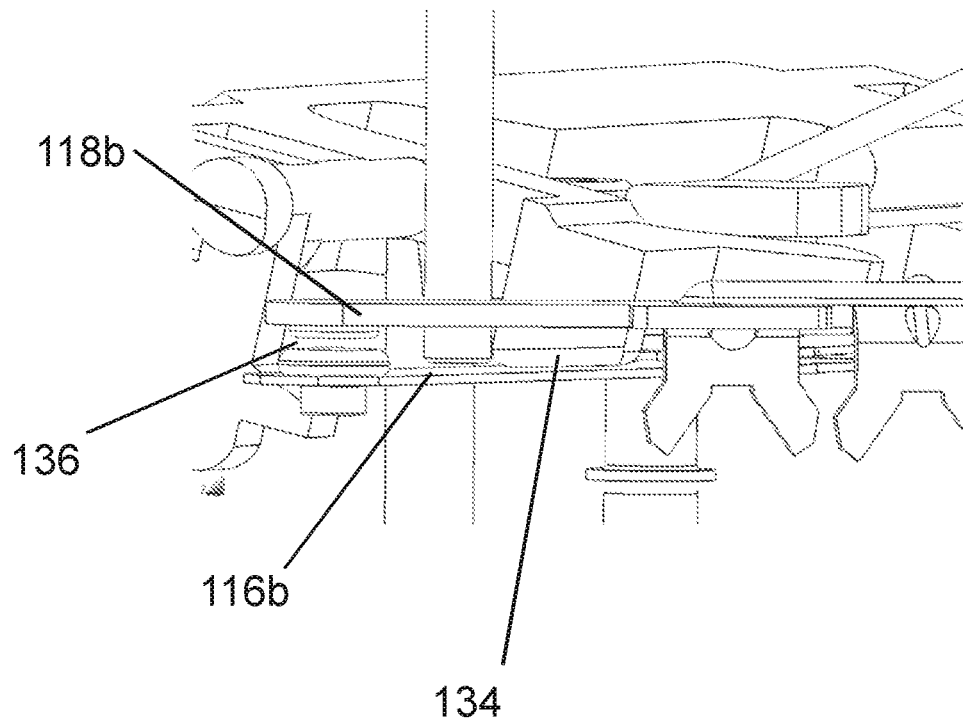
FIG. 20 shows a close-up of the second moveable member and second fixed tab with the control in the position seen in FIG. 19.

FIG. 19 shows a perspective view of the control 102 and base connector part 8, in the respective positions seen in FIG. 18, with the plastic body 104, mount plate 113, neutral ring 106b and earth ring 106c removed in order to show more clearly the inner components of the control 102. As will be appreciated, as the control 102 is separated from the base connector part 8, the base connector part 8 will no longer completely overcome the resilient bias, by pushing up on the plunger 130, and thus the resilient bias provided by the wire spring member 132 will drive the release member 126 downwards such that the release part 128 contacts, and drives the paddle 124 downwards thus pivoting the arm 120. This pivotal movement drives the arm 120 such that the switching member 134 contacts, and drives the second moveable member 116b away from the fixed tab 118b, such that the electrical contacts on each of the second moveable member 116b and fixed tab 118b are separated from one another. FIG. 20 shows a close-up view focusing on the second moveable member 116b and second fixed tab 118b. As can be seen more clearly in this Figure, the switching member 134 has acted on the second moveable member 116b to separate it from the fixed tab 118b to create a gap 136 therebetween. Separating the second moveable member 116b from the second fixed tab 118b separates their respective electrical contacts, and thus breaks the electrical power supply circuit. Once broken, electrical power is no longer supplied to the appliance into which the control 102 is arranged.

Figure 21:
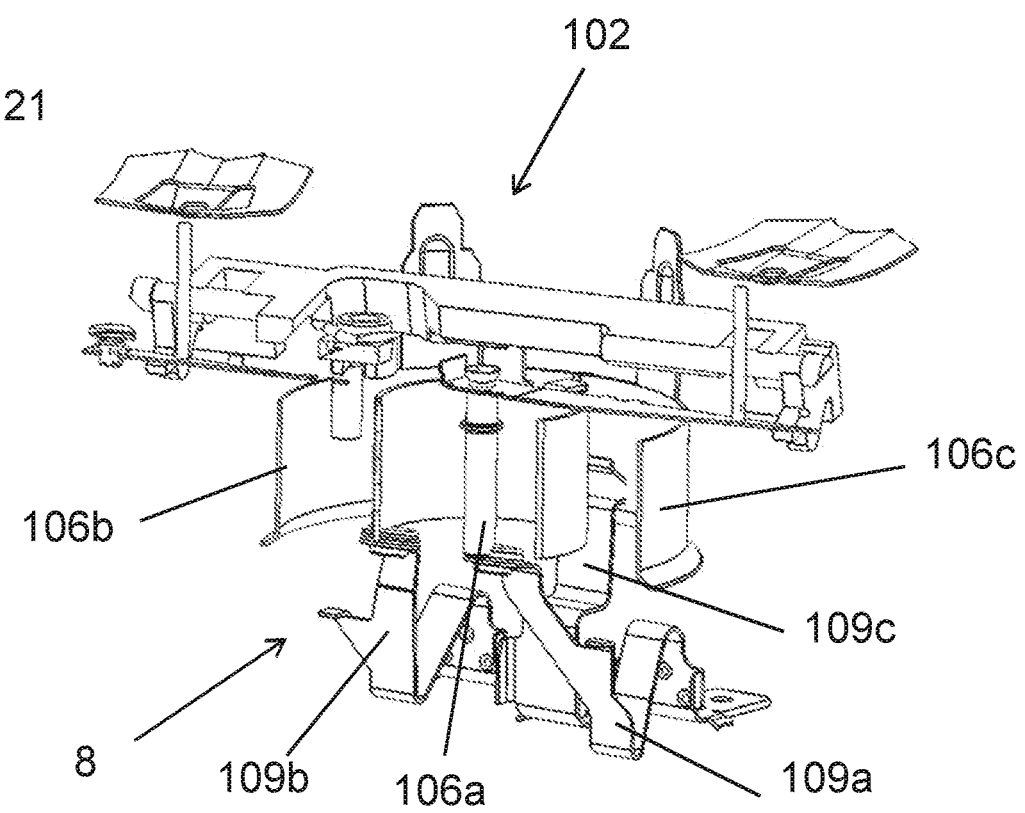
FIG. 21 shows a partially cut-away view of the control seen in FIG. 11 partially separated from a corresponding base connector part.

FIG. 21 shows a partially cut-away view through the control 102 and base connector part 8, with the outer plastic body of the base connector part 8 removed, with the control 102 and base connector part 8 in the respective positions as seen in FIG. 18. As can be seen, in this position, the live, neutral and earth contacts 109a, 109b, 109c of the base connector part 8, are still in contact with the live pin 106a, neutral ring 106b and earth ring 106c.

Therefore, as will be appreciated by those skilled in the art, as the control 102 is separated from the base connector part 8, the release member 126 acts to drive the arm 120 such that the switching member 134 separates the second moveable member 116b from the second fixed tab 118b to break the electrical supply circuit, before the electrical supply circuit is broken through separation of one of the live and/or neutral contacts 109a, 109b from the respective live pin 106a and neutral ring 106b. The arrangement seen in this embodiment thus advantageously ensures that switching always occurs between the contacts on the second moveable member 116b and second fixed tab 118b, which reduces the amount of silver coating needed on the live and neutral contacts 109a, 109b on the base connector part 8 and the live pin 106a and neutral ring 106b on the control 102.

Figure 22:
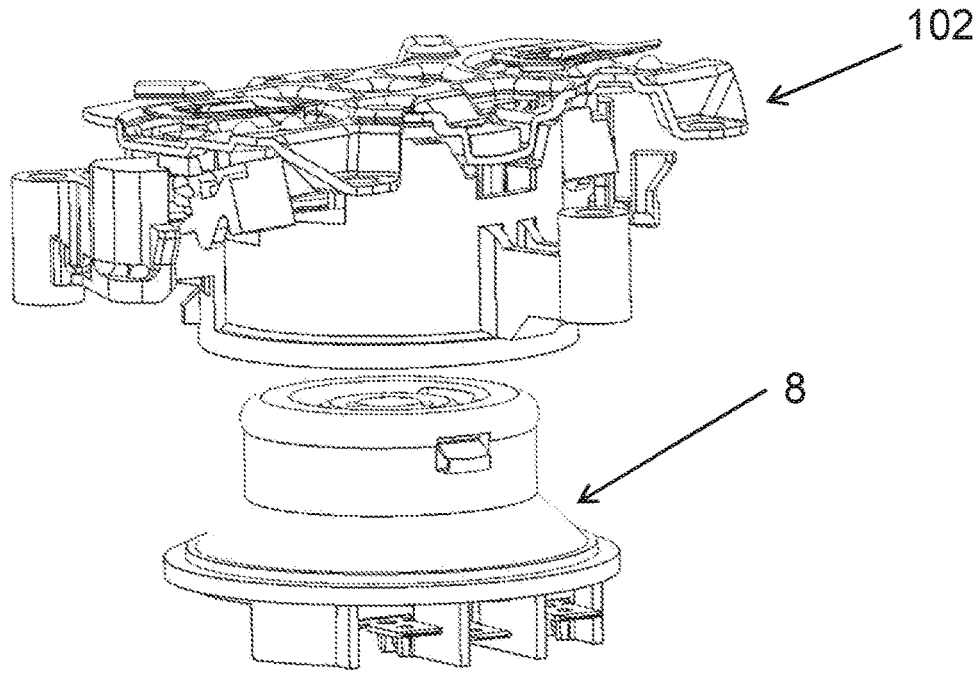
FIG. 22 shows a perspective view of the control seen in FIG. 11 fully separated from the corresponding base connector part.
Figure 23:
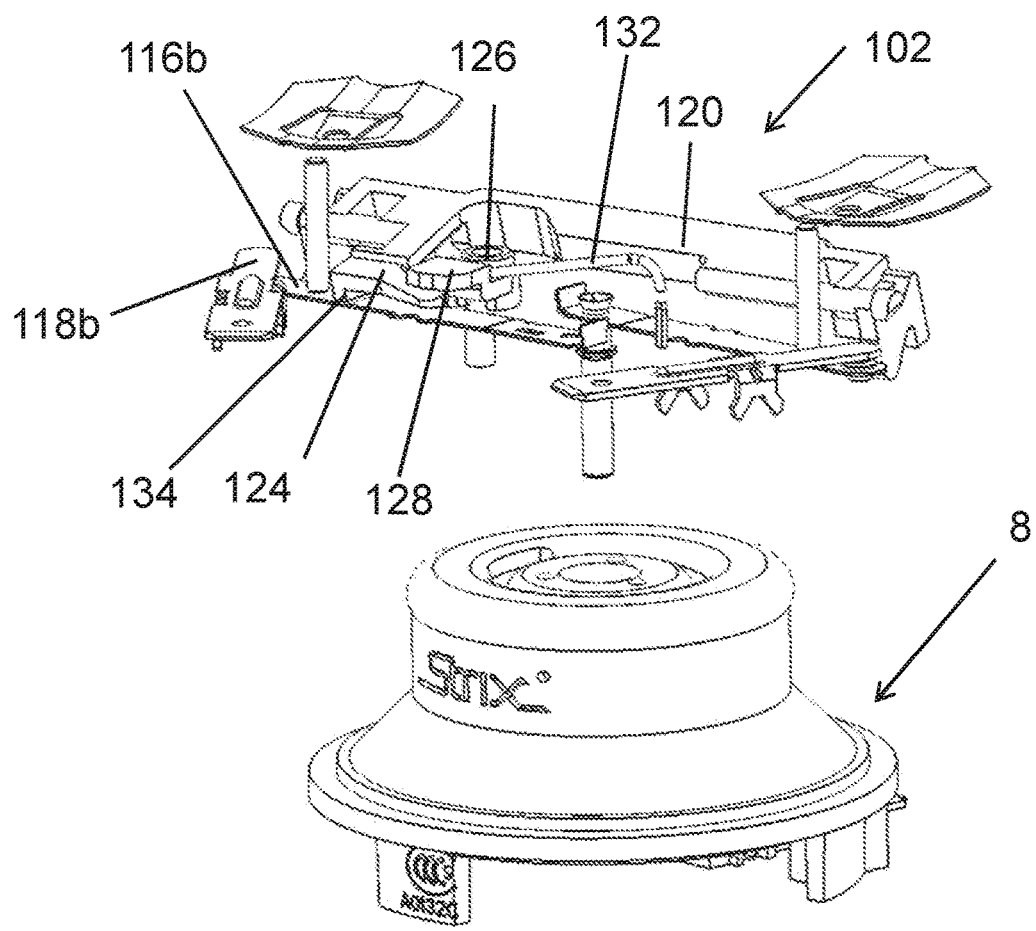
FIG. 23 shows a perspective view of the control seen in FIG. 11 fully separated from the corresponding base connector part with the main body and mount plate removed.
Figure 24:
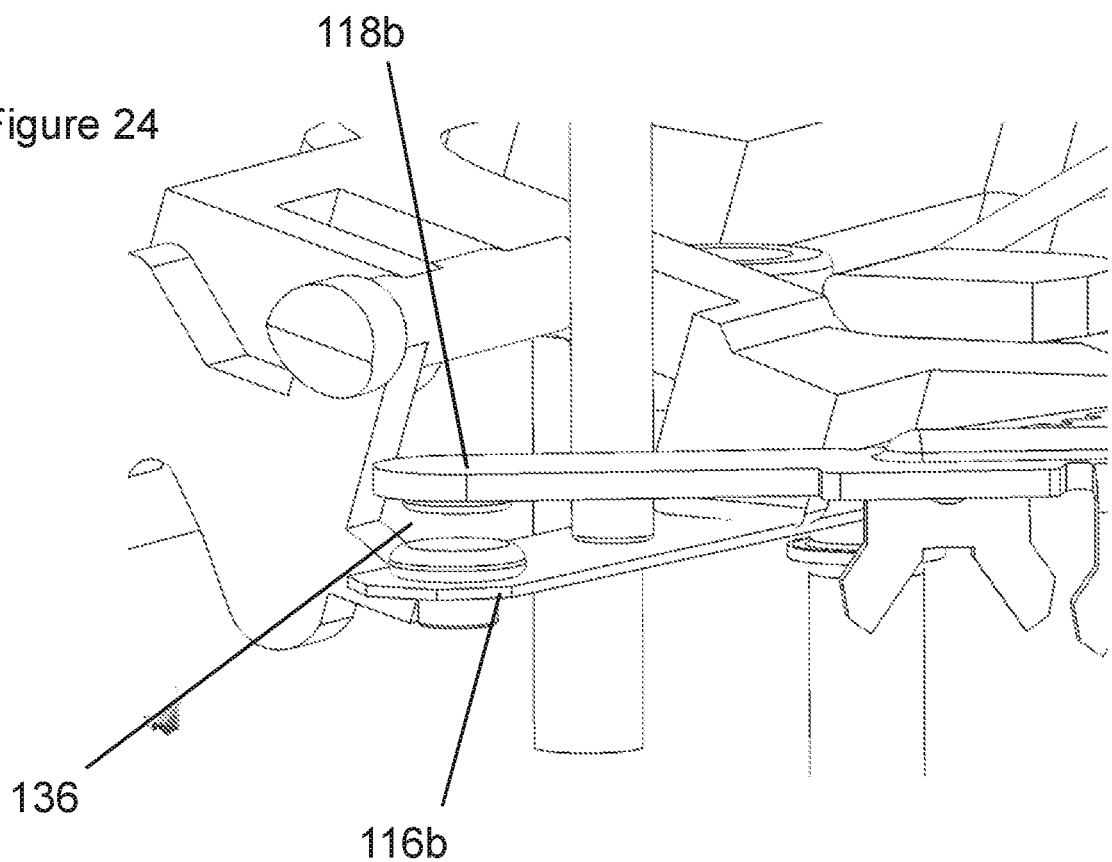
FIG. 24 shows a close-up view of the second moveable member and second fixed tab with the control separated as seen in FIG. 22.

FIG. 22 shows a perspective view of the control 102 fully separated from the base connector part 8. FIG. 23 shows a perspective view of the control 102 and base connector part 8, in the respective positions seen in FIG. 22, with the plastic body 104, mount plate 113, neutral ring 106b and earth ring 106c removed in order to show more clearly the inner components of the control 102. With control 102 and base connector part 8 fully separated, the wire spring member 132 drives the release member 126 further downwards such that the release part 128 acts on the paddle 124 to further pivot the arm 120. Further pivotal movement of the arm 120 drives the switching member 134 provided thereon to further separate the second moveable member 116b and second fixed tab 118b. FIG. 24 shows a close-up view focusing on the second moveable member 116b and second fixed tab 118b. As is visible in this Figure, the gap 136 between the second moveable member 116b and the second fixed tab 118b has been increased. As soon as the electrical contacts on the second moveable member 116b and second fixed tab 118b are separated, through movement of the second moveable member 116b, the electrical circuit will be broken. Increasing the separation of these contacts reduces the chances of electrical arcing occurring between the contacts and thus avoids the risk of potential damage to the control 102.

Figure 25:
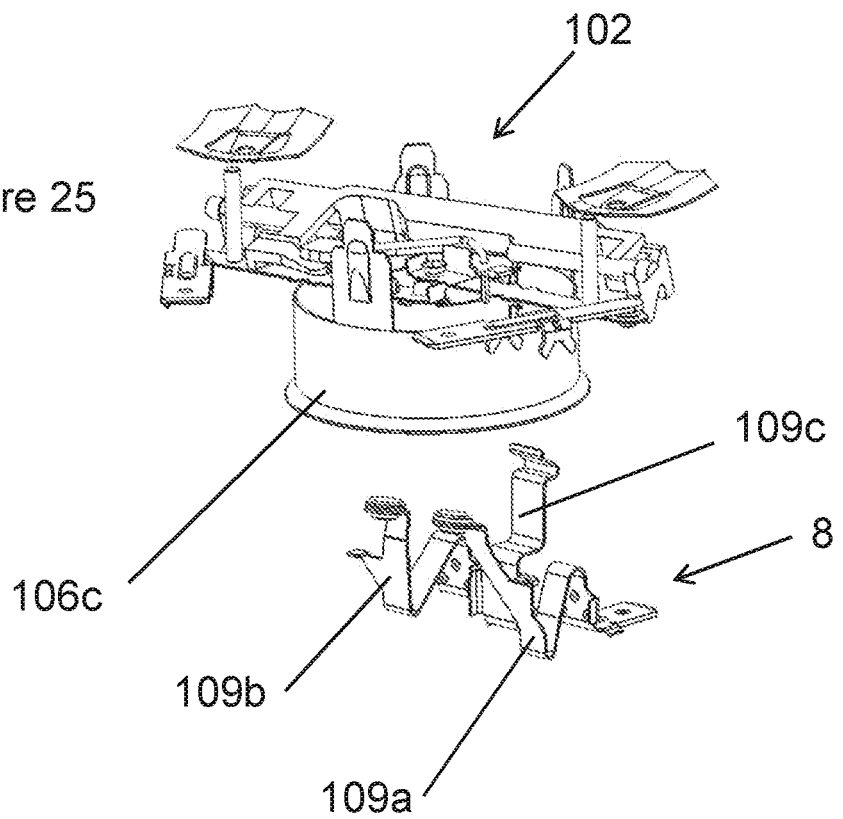
FIG. 25 shows a perspective view of the control seen in FIG. 11 fully separated from the corresponding base connector part, with the main body and mount plate removed.

FIG. 25 shows a partially cut-away view through the control 102 and base connector part 8, with the outer plastic body of the base connector part 8 removed, with the control 102 and base connector part 8 in the respective positions as seen in FIG. 22. With the control 102 and base connector part 8 fully separated, the live, neutral and earth contacts 109a, 109b, 109c of the base connector part 8, are fully separated from the live pin 106a (not visible), neutral ring 106b (not visible) and earth ring 106c.

With reference to FIGS. 11 to 25, as will be appreciated by those skilled in the art, whenever the control 102 is separated from the corresponding base connector part 8, the release member 126 will move to drive the arm 120 such that the switching member 134 moves the second moveable member 116b into an open configuration wherein the electrical contact provided thereon is separated from the electrical contact provided on the second fixed tab 118b. This will ensure that switching never occurs between the cordless connector part 106 and corresponding base connector part 8.

In the situation wherein the control 102 and corresponding base connector part 8 are fully mated and one of the first or second thermally sensitive actuators 112a, 112b has operated to separate at least one of the first or second moveable members 116a, 116b from the corresponding first or second fixed tab 118a, 118b, the arm 120 will pivot such that at least one of the respective first or second latches 122a, 122b moves into a latching position. This will occur in the same way as described above with respect to the embodiment seen in FIGS. 1-8. Unlike this earlier embodiment, however, when the control 102 begins to be separated from the corresponding base connector part 8, the arm 120 will pivot such that the at least one of the first or second latches 122a, 122b is moved out of its latching position, whilst at the same time the switching member 134 drives the second moveable member 116b into its open configuration. As will be appreciated, in the instance where the second thermally sensitive actuator 112b has operated and the second moveable member 116b is already in its open configuration, as the second latch 122b is moved out from its latching position, to allow the second moveable member 116b to move back to its closed configuration, the switching member 134 is moved into a position which prevents the movement of the second moveable member 116b back into its closed configuration. If, on the other hand, only the first thermally sensitive actuator 112a has operated, and thus only the first moveable member 116a is held in its open configuration by the first latch 122a, when the control 102 is separated from the corresponding base connector 8, the arm 120 will pivot to release the first latch 122a. This allows the first moveable member 116a to move back to its closed configuration, whilst at the same time moving the switching member 134 so as to drive the second moveable member 116b into its open configuration thereby ensuring that the power supply circuit remains broken as the control 102 is separated.

With the control 102 separated from the corresponding base connector part 8, and with the second moveable member 116b held in the open configuration by the switching member 134 acted upon by the resiliently biased release member 126, the control 102 may be mated again with the corresponding base connector part 8, in order to supply power to the appliance, in which the control 102 is mounted. When the control 102 is mated again with the corresponding base connector part 8, the corresponding base connector part 8 will push on the plunger 130 to move the release member 126 upwards and overcome the resilient bias provided by the wire spring 132. This will move the force being applied to the arm 120, which will then be free to pivot away from the second moveable member 116b due to the relative position of its center of mass. This movement will mean that the switching member 134 no longer applies a force to the second moveable member 116b and as the second moveable member 116b is provided by a leaf spring, it will automatically move back to its closed configuration. The electrical power supply circuit, at least within the control 102, will then be remade. Of course, whether the entire electrical circuit is made will depend on other electrical components connected to the control, e.g. a separate manually operable switch.

Figure 26:
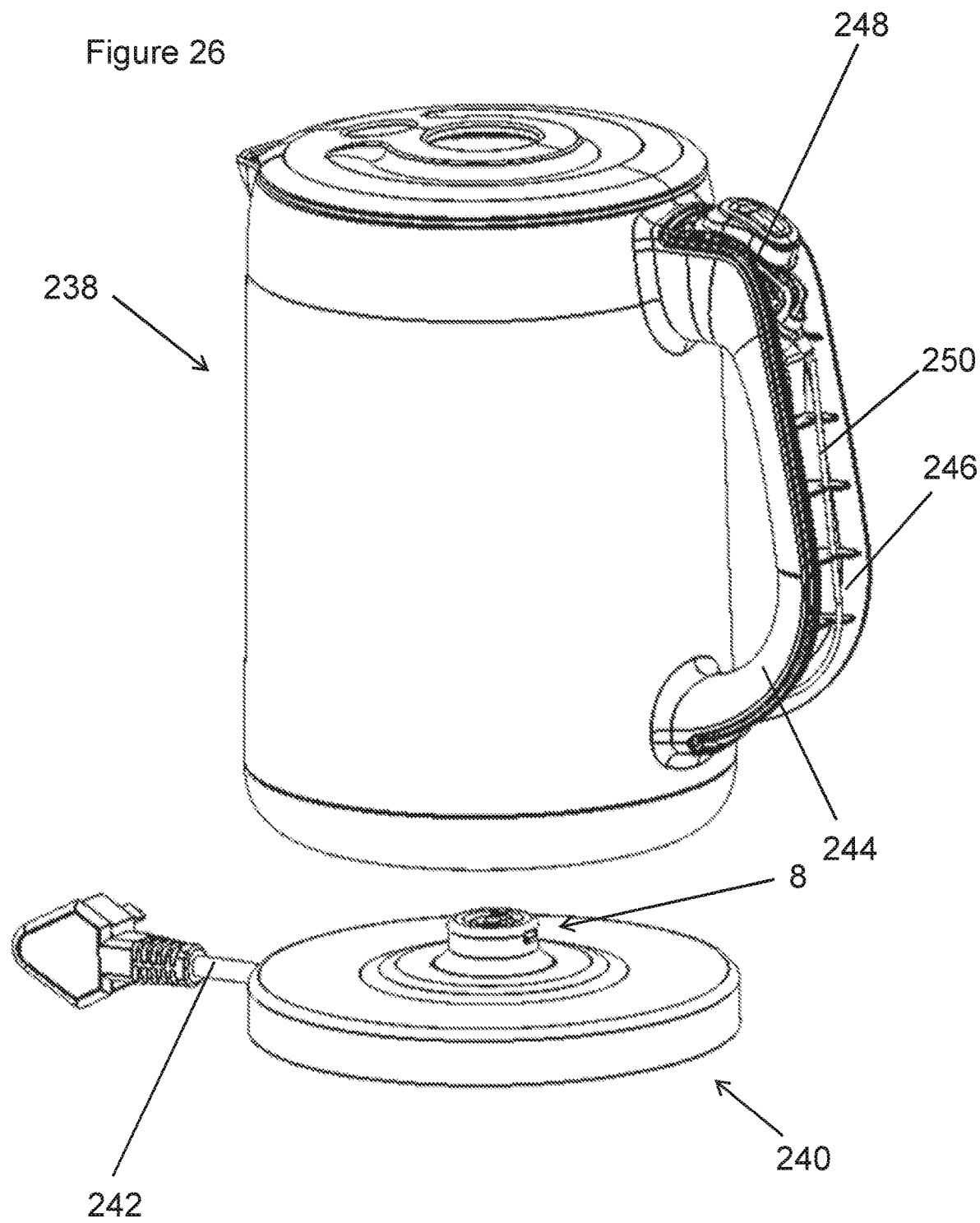
FIG. 26 shows a perspective view of a kettle comprising a control in accordance with an embodiment of the invention.

FIG. 26 shows a perspective view of a liquid heating apparatus in the form of a cordless kettle 238 and associated base 240. The cordless kettle 238 comprises a cordless control 102 (not visible in this Figure) of the type seen in FIGS. 11-25. The control 102 functions in the same manner as described above with respect to FIGS. 11-25. The base 240 comprises a base connector part 8 as seen in FIG. 5b. A power cord 242 is electrically connected to the base connector part 8 and extends from the base 240. When connected to an appropriate power supply, the power cord 242 provides the cordless kettle 238 with electrical power, when the cordless kettle 238 is mated with the base 240.

In this particular embodiment the cordless kettle 238 comprises a handle 244 to allow a user to more easily lift the cordless kettle 238 away from the base 240. In the view shown in FIG. 26 an outermost cover of the handle 244 is removed to reveal an internal channel 246. Arranged at the top of the internal channel 246 is an electrical switching arrangement 248. The electrical switching arrangement 248 is electrically connected to the cordless control 102 (not shown in this Figure) by electrical cables, including an electrical cable 250, which run along the internal channel 246. This connection can be seen more clearly in FIG. 27.

FIG. 27 shows a perspective view, when viewed from the bottom, of the cordless kettle 238 with a base cover and outer cover removed to reveal an inner vessel 252. Arranged at the base of the inner vessel 252 is the cordless control 102 and a sheathed heating element 254. The sheathed heating element 254 is arranged to heat the base of the inner vessel 252 in order to heat the contents thereof. As can be seen in this Figure, the control 102 comprises a first electrical terminal 156a electrically connected to the first moveable electrical contact (not visible in this Figure) and a second electrical terminal 156b electrically connected to the second moveable electrical contact (not visible in this Figure). The first electrical terminal 156a is electrically connected in series with the sheathed heating element 254 via a cable 258 which connects the first electrical terminal 156a to a first cold tail 260 of the sheathed electrical heating element 254. A second cold tail 262 of the sheathed heating element 254 is electrically connected in series with a first terminal 264 of the electrical switching arrangement 248 via a second cable 250. A second terminal 266 of the electrical switching arrangement 248 is electrically connected in series with the second electrical terminal 156b of the control 102 via a third cable 268. Accordingly, as will be appreciated by those skilled in the art, the sheathed heating element 254 and electrical switching arrangement 248 are physically separate from the control 102 and connected electrically in series with the first and second electrical terminals 156a, 156b of the control 102.

The electrical switching arrangement 248 may comprise a manual switch which functions to allow a user to manually make or break the electrical circuit and/or it may comprise, for example, a thermomechanical element arranged to break the electrical circuit when it detects a specific temperature within the kettle 238, e.g. when it detects steam resulting from boiling.

Of course the control 102 seen in FIG. 27 could be exchanged for the control 2 seen in earlier Figures.

Where components are referred to as "first" and/or "second" above, these are merely labels and "first" and "second" may be interchanged as appropriate.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A thermally sensitive control for controlling an electrical power supply circuit to a heater in a liquid heating appliance, the control comprising:
   a cordless electrical connector part arranged to mate with a corresponding base electrical connector part;
   first and second moveable electrical contacts mounted on first and second moveable members, each mating with a corresponding fixed electrical contact in the electrical power supply circuit when the first and second moveable members are respectively in a closed position;
   first and second thermally sensitive snap-action bimetallic actuators, each independently operable at an overheat temperature to move a respective one of the first and second moveable members from the closed position to an open position wherein the first and second moveable electrical contacts are separated from the fixed electrical contacts to interrupt the electrical power supply circuit;
   a pivotally mounted latch arm extending laterally across the control between the first and second moveable members, the latch arm comprising a first latch for the first moveable member and a second latch for the second moveable member; and
   a release member comprising a release part and a plunger projecting from the cordless electrical connector part, wherein the release member is resiliently biased to bring the release part into contact with the latch arm but the resilient bias is overcome when the plunger bears against a surface of the corresponding base electrical connector part;
   wherein, when the cordless electrical connector part is mated with the corresponding base electrical connector part, and when at least one of the first and second moveable members is moved towards the open position, such movement causes the latch arm to pivot so that the respective first or second moveable member moves past the respective first or second latch before the latch arm pivots back to adopt a latching position, in which the first or second latch can prevent the respective first and second moveable member from subsequently moving from the open position back to the closed position; and
   wherein, when the cordless electrical connector part is separated from the corresponding base electrical connector part, the release part is resiliently biased into contact with the latch arm, thereby causing the latch arm to pivot out of the latching position such that the first and/or second moveable member is no longer prevented from moving from the open position back to the closed position.

2. The control of claim 1, wherein the latch arm adopts a latching position in which the first/second latch engages with the first/second moveable member so as to prevent the first/second moveable member from subsequently moving from the open position back to the closed position.

3. The control of claim 1, wherein the open position comprises a first stage in which the first/second moveable member is spaced away from the respective first/second latch and a second stage in which the first/second moveable member is in contact with the respective first/second latch.

4. The control of claim 1, wherein the movement of the first and/or second moveable members towards the open position causes the latch arm to pivot by at least one of the first or second moveable members pushing against the latch arm.

5. The control of claim 1, wherein the latch arm is arranged to automatically pivot back to its latching position under an action of gravity.

6. The control of claim 1, wherein the control comprises a control body, the cordless electrical connector part being formed in the control body, and wherein the latch arm and release member are mounted to the control body.

7. The control of claim 1, wherein the plunger projects downwardly from the cordless electrical connector part and the release member is resiliently biased downwardly to bring the release part into contact with the latch arm.

8. The control of claim 1, wherein the control comprises a control body, the cordless electrical connector part being formed in the control body, and wherein the release member is mounted to the control body for resiliently biased movement relative to the control body.

9. The control of claim 1, wherein the release member is resiliently biased such that the release part also causes movement of the first moveable member into the open position and the release member is arranged such that as the cordless electrical connector part is being separated from the corresponding base electrical connector part, the release part drives the first moveable member into the open position thereby interrupting the electrical power supply circuit.

10. The control of claim 9, wherein the cordless electrical connector part comprises at least two mating conductors arranged to come into contact with at least two corresponding electrical terminations in the corresponding base electrical connector part when the cordless electrical connector part and corresponding base electrical connector part are fully mated together, and wherein the release member is arranged such that as the cordless electrical connector part is being separated from the corresponding base electrical connector part, the release part drives the first moveable member into the open position, thereby interrupting the electrical power supply circuit whilst the at least two mating conductors in the cordless electrical connector part are still in contact with the corresponding at least two electrical terminations in the base electrical connector part.

11. The control of claim 9, wherein the resiliently biased release part drives a switching member into contact with the first moveable member to move the first moveable member into the open position.

12. The control of claim 11, wherein the latch arm comprises a pivot axis about which the latch arm is pivotally mounted, and wherein the first latch and second latch and the switching member are arranged such that, when the latch arm is driven by the release member, as at least one of the first latch and second latch is moved out of the latching position, the switching member is moved into contact with the first moveable member.

13. The control of claim 1, wherein the second moveable member is only capable of being moved by the second thermally sensitive snap-action bimetallic actuator.

14. A kit of parts comprising:
  a thermally sensitive control comprising:
    a control body;
    a thermally sensitive control for controlling an electrical power supply circuit to a heater in a liquid heating appliance, the control comprising:
    a cordless electrical connector part arranged to mate with a corresponding base electrical connector part;
    first and second moveable electrical contacts mounted on first and second moveable members, each mating with a corresponding fixed electrical contact in the electrical power supply circuit when the first and second moveable members are respectively in a closed position;
    first and second thermally sensitive snap-action bimetallic actuators, each independently operable at an overheat temperature to move a respective one of the first and second moveable members from the closed position to an open position wherein the first and second moveable electrical contacts are separated from the fixed electrical contacts to interrupt the electrical power supply circuit;
    at least one latch arm mounting feature on the control body for mounting a pivotally mounted latch arm extending laterally across the control between the first and second moveable members;
    at least one release member mounting feature on the control body for positioning a release member;
  a latch arm comprising a first latch for the first moveable member and a second latch for the second moveable member, mountable to the latch arm mounting feature; and
  a release member comprising a release part and a plunger wherein the release member is mountable to the release member mounting feature so as to be resiliently biased to bring the release part into contact with the latch arm but the resilient bias is overcome when the plunger bears against a surface of the corresponding base electrical connector part,
  such that when the latch arm and release member are mounted, when the cordless electrical connector part is mated with the corresponding base electrical connector part, and when at least one of the first and second moveable members is moved towards the open position, such movement causes the latch arm to pivot so that the respective first or second moveable member moves past the respective first or second latch before the latch arm pivots back to adopt a latching position, in which the first or second latch can prevent the respective first and second moveable member from subsequently moving from the open position back to the closed position; and
  wherein, when the cordless electrical connector part is separated from the corresponding base electrical connector part, the release part is resiliently biased into contact with the latch arm, thereby causing the latch arm to pivot out of the latching position such that the first and/or second moveable member is no longer prevented from moving from the open position back to the closed position.

15. A liquid heating appliance comprising:
  a control unit comprising:
    a cordless electrical connector part arranged to mate with a corresponding base electrical connector part provided in a cordless base;
    a first moveable electrical contact mounted on a first moveable member mating with a corresponding fixed electrical contact in the electrical power supply circuit when the first moveable member is in a closed position;
    a release member comprising a release part and a plunger projecting from the cordless electrical connector part, wherein the release member is resiliently biased such that, when the cordless electrical connector part is being separated from the corresponding base electrical connector part in use, the resiliently biased release part drives movement of the first moveable member from the closed position to an open position wherein the first moveable electrical contact is separated from the fixed electrical contact to interrupt the electrical power supply, but the resilient bias is overcome when the plunger bears against a surface of the cordless base when mated;
    a first electrical terminal electrically connected to the first moveable electrical contact and a second electrical terminal electrically connected to the fixed electrical contact;
  an electrical heater; and
  an electrical switching arrangement physically separate from but electrically connected to the control unit between the first electrical terminal and the second electrical terminal of the control unit, wherein the electrical switching arrangement is arranged in a different part of the appliance to the control unit.

16. The liquid heating appliance as claimed in claim 15, wherein the electrical switching arrangement comprises a thermomechanical switch.

17. The liquid heating appliance as claimed in claim 15, wherein the electrical switching arrangement comprises an electronic switching arrangement.

18. The liquid heating appliance as claimed in claim 15, wherein the cordless electrical connector part comprises at least two mating conductors arranged to come into contact with at least two corresponding electrical terminations in the corresponding base electrical connector part when the cordless electrical connector part and corresponding base connector part are fully mated together, and wherein the release member is arranged such that as the cordless electrical connector part is being separated from the corresponding base electrical connector part, the release part drives the first moveable member into the open position, thereby interrupting the electrical power supply circuit whilst the at least two mating conductors in the cordless electrical connector part are still in contact with the corresponding at least two electrical terminations in the base electrical connector part.

19. The liquid heating appliance as claimed in claim 15, wherein the resiliently biased release part drives a switching member into contact with the first moveable member to move the first moveable member into the open position.

20. The liquid heating appliance as claimed in claim 19, wherein the switching member is integrally provided with a pivotally mounted arm, mounted within the control unit.

21. The liquid heating appliance as claimed in claim 15, wherein the control unit is arranged in a base of the liquid heating appliance and the electrical switching arrangement is arranged in an upper portion of the liquid heating appliance.

* * * * *